US007568890B2

(12) United States Patent
Findlay et al.

(10) Patent No.: US 7,568,890 B2
(45) Date of Patent: Aug. 4, 2009

(54) LP TURBINE VANE AIRFOIL PROFILE

(75) Inventors: Peter Findlay, Montreal (CA); Krishan Mohan, Longueuil (CA); Saml Girgis, Montreal (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 434 days.

(21) Appl. No.: 11/562,577

(22) Filed: Nov. 22, 2006

(65) Prior Publication Data

US 2008/0118360 A1 May 22, 2008

(51) Int. Cl.
*B64C 27/46* (2006.01)
*B64C 27/473* (2006.01)
*F01D 5/14* (2006.01)

(52) U.S. Cl. ............... 416/223 A; 416/191; 416/DIG. 2

(58) Field of Classification Search ................. 415/191; 416/143, 191, 223 A, 223 R, 243, DIG. 2, 416/DIG. 5
See application file for complete search history.

(56) References Cited

U.S. PATENT DOCUMENTS 5,267,834 A * 12/1993 Dinh et al. .............. 416/223 A
5,299,915 A * 4/1994 Dinh et al. .............. 416/223 A
6,398,489 B1 * 6/2002 Burdgick et al. ............ 415/115
6,503,054 B1 * 1/2003 Bielek et al. ................ 415/191
6,503,059 B1 * 1/2003 Frost et al. .............. 416/223 A
6,722,853 B1 * 4/2004 Humanchuk et al. .... 416/223 A
6,736,599 B1 * 5/2004 Jacks et al. ................. 415/191
6,802,695 B2 * 10/2004 Haller ..................... 416/223 R
6,832,897 B2 * 12/2004 Urban ..................... 416/223 A
6,854,961 B2 * 2/2005 Zhang et al. ............ 416/223 A
6,910,868 B2 * 6/2005 Hyde et al. ............. 416/223 R
7,001,147 B1 * 2/2006 Phillips et al. .............. 415/191
7,367,779 B2 * 5/2008 Girgis et al. ............ 416/223 A
2005/0079061 A1 4/2005 Beddard

OTHER PUBLICATIONS

U.S. Appl. No. 11/366,018, filed Mar. 2, 2006, Girgis et al.
U.S. Appl. No. 11/366,025, filed Mar. 2, 2006, Girgis et al.
U.S. Appl. No. 11/366,020, filed Mar. 2, 2006, Girgis et al.
U.S. Appl. No. 11/366,015, filed Mar. 2, 2006, Girgis et al.
U.S. Appl. No. 11/366,026, filed Mar. 2, 2006, Girgis et al.
U.S. Appl. No. 11/514,987, filed Sep. 5, 2006, Marini et al.
U.S. Appl. No. 11/514,983, filed Sep. 5, 2006, Ravanis et al.

(Continued)

*Primary Examiner*—Edward Look
*Assistant Examiner*—Sean J Younger
(74) *Attorney, Agent, or Firm*—Ogilvy Renault

(57) ABSTRACT

A single stage low pressure turbine vane includes an airfoil having a profile substantially in accordance with at least an intermediate portion of the Cartesian coordinate values of X, Y and Z set forth in Table 2. The X and Y values are distances, which when smoothly connected by an appropriate continuing curve, define airfoil profile sections at each distance Z. The profile sections at each distance Z are joined smoothly to one another to form a complete airfoil shape.

15 Claims, 3 Drawing Sheets

OTHER PUBLICATIONS

U.S. Appl. No. 11/514,990, filed Sep. 5, 2006, Tsifourdaris et al.
U.S. Appl. No. 11/514,989, filed Sep. 5, 2006, Girgis et al.
U.S. Appl. No. 11/514,972, filed Sep. 5, 2006, Mah et al.
U.S. Appl. No. 11/470,416, filed Sep. 6, 2006, Trindade et al.
U.S. Appl. No. 11/516,598, filed Sep. 7, 2006, Papple et al.
U.S. Appl. No. 11/516,601, filed Sep. 7, 2006, Sleiman et al.
U.S. Appl. No. 11/516,599, filed Sep. 7, 2006, Sreekanth et al.
U.S. Appl. No. 11/563,839, filed Nov. 28, 2006, Marini et al.
U.S. Appl. No. 11/563,808, filed Nov. 28, 2006, Ravanis et al.
U.S. Appl. No. 11/563,801, filed Nov. 28, 2006, Kidikian et al.
U.S. Appl. No. 11/563,797, filed Nov. 28, 2006, Kidikian et al.
U.S. Appl. No. 11/563,783, filed Nov. 28, 2006, Kidikian et al.

* cited by examiner

LP TURBINE VANE AIRFOIL PROFILE

TECHNICAL FIELD

The invention relates generally to a vane airfoil for a gas turbine engine and, more particularly, to an airfoil profile suited for a low pressure turbine (LPT) stage vane.

BACKGROUND OF THE ART

Where a vane airfoil is part of a single stage turbine driving a fan or other output shaft (i.e. is part of a single stage LP turbine), as opposed to being part of multiple stage turbine, the requirements for such a vane airfoil design are significantly more stringent, as the fan/output shaft relies solely on this single stage LP turbine to deliver work, as opposed to work being spread over several turbine stages. Over and above this, the airfoil is subject to flow regimes which lend themselves easily to flow separation. Such a situation would limit the amount of work transferred to the fan/output shaft, and hence the total thrust (or power) capability of the engine. Further complicating the aerodynamic situation in a single stage LP turbine occurs where the LP vane follows a transonic high pressure turbine stage (HPT), and where a significant gaspath flare angle away from the engine center line, which is provided to improve work output of the turbine, but which then must be re-directed by the LP vane into being more parallel to the engine center line prior to entering the following LP blade passage. Therefore, improvements in airfoil design are sought

SUMMARY OF THE INVENTION

It is therefore an object of this invention to provide an improved vane airfoil design for use in a single stage low pressure turbine.

In one aspect, the present invention provides a turbine vane for a gas turbine engine comprising an airfoil having an intermediate portion defined by a nominal profile substantially in accordance with Cartesian coordinate values of X, Y, and Z of Sections 3 to 8 set forth in Table 2, wherein the point of origin of the orthogonally related axes X, Y and Z is located at an intersection of a centerline of the gas turbine engine and a stacking line of the turbine vane, the Z values are radial distances measured along the stacking line, the X and Y are coordinate values defining the profile at each distance Z.

In another aspect, the present invention provides a turbine vane for a gas turbine engine having an intermediate airfoil portion at least partly defined by a nominal profile substantially in accordance with Cartesian coordinate values of X, Y, and Z of Sections 3 to 8 set forth in Table 2, wherein the point of origin of the orthogonally related axes X, Y and Z is located at an intersection of a centerline of the gas turbine engine and a stacking line of the turbine vane, the Z values are radial distances measured along the stacking line, the X and Y are coordinate values defining the profile at each distance Z, and wherein the X and Y values are scalable as a function of the same constant or number.

In another aspect, the present invention provides a turbine stator assembly for a gas turbine engine comprising a plurality of vanes, each vanes including an airfoil having an intermediate portion defined by a nominal profile substantially in accordance with Cartesian coordinate values of X, Y, and Z of Sections 3 to 8 set forth in Table 2, wherein the point of origin of the orthogonally related axes X, Y and Z is located at an intersection of a centerline of the gas turbine engine and a stacking line of the turbine vane, the Z values are radial distances measured along the stacking line, the X and Y are coordinate values defining the profile at each distance Z.

In another aspect, the present invention provides a low pressure turbine vane comprising at least one airfoil having a surface lying substantially on the points of Table 2, the airfoil extending between platforms defined generally by Table 1, wherein a fillet radius is applied around the airfoil between the airfoil and platforms, and wherein the values of Table 2 are subject to relevant tolerance.

The design profile of the present invention improves performance of a single stage LPT. The airfoil hub and tip sections are optimized to reduce re-circulation zones at the airfoil leading edge. The location and gaspath around the airfoil are optimized to reduce the interturbine losses and re-direct the flow more parallel to the engine centerline prior to entering the LP blade. The interturbine gaspath is also optimized to the high flow requirements. The aerodynamic shape of the airfoil is also optimized to reduce secondary losses and decrease the airfoil exit swirl.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
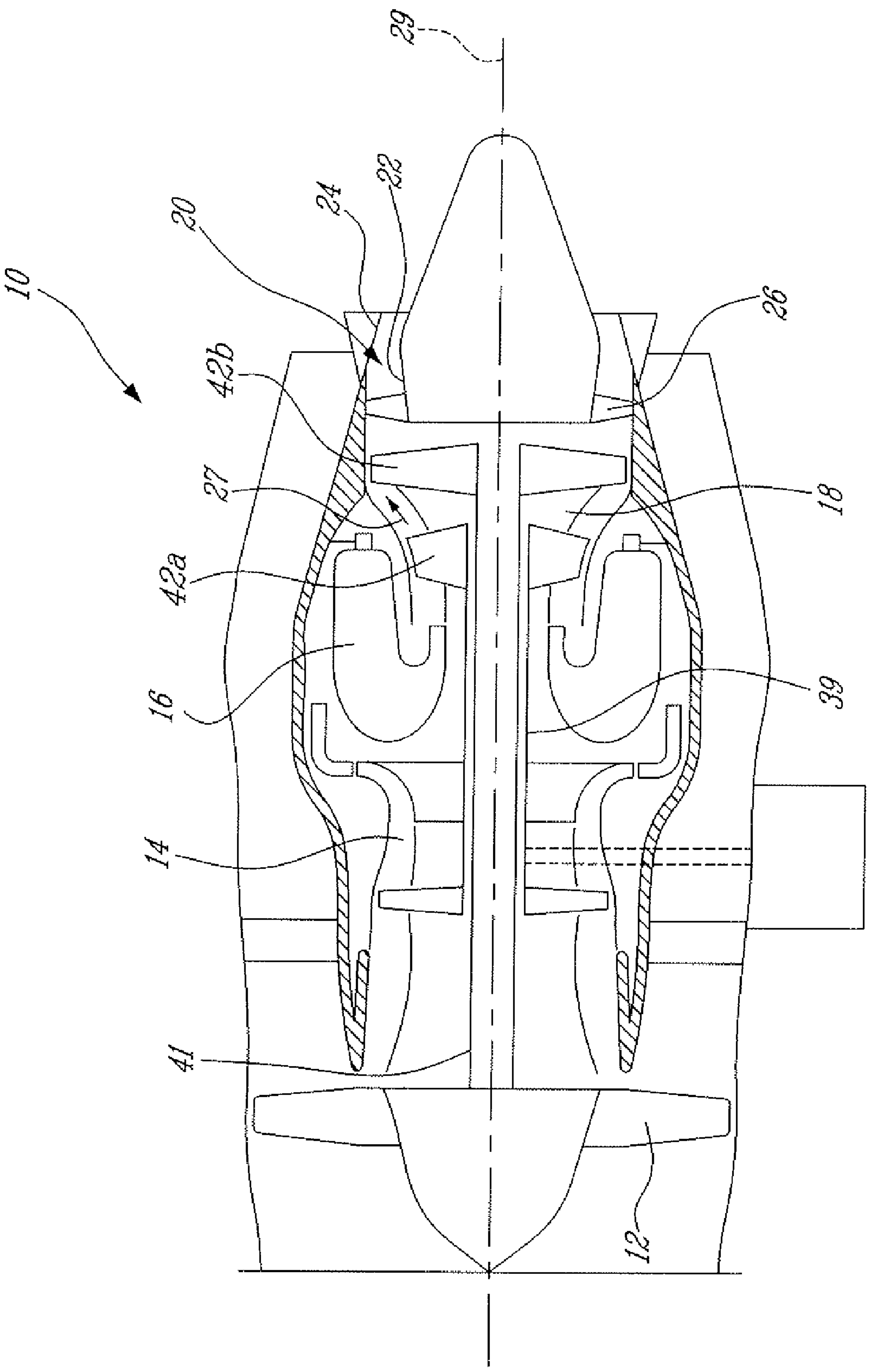
FIG. 1 is a schematic view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases to drive the fan, the compressor, and produce thrust.

The gas turbine engine 10 further includes a turbine exhaust duct 20 which is exemplified as including an annular core portion 22 and an annular outer portion 24 and a plurality of struts 26 circumferentially spaced apart, and radially extending between the inner and outer portions 22, 24.

Figure 2:
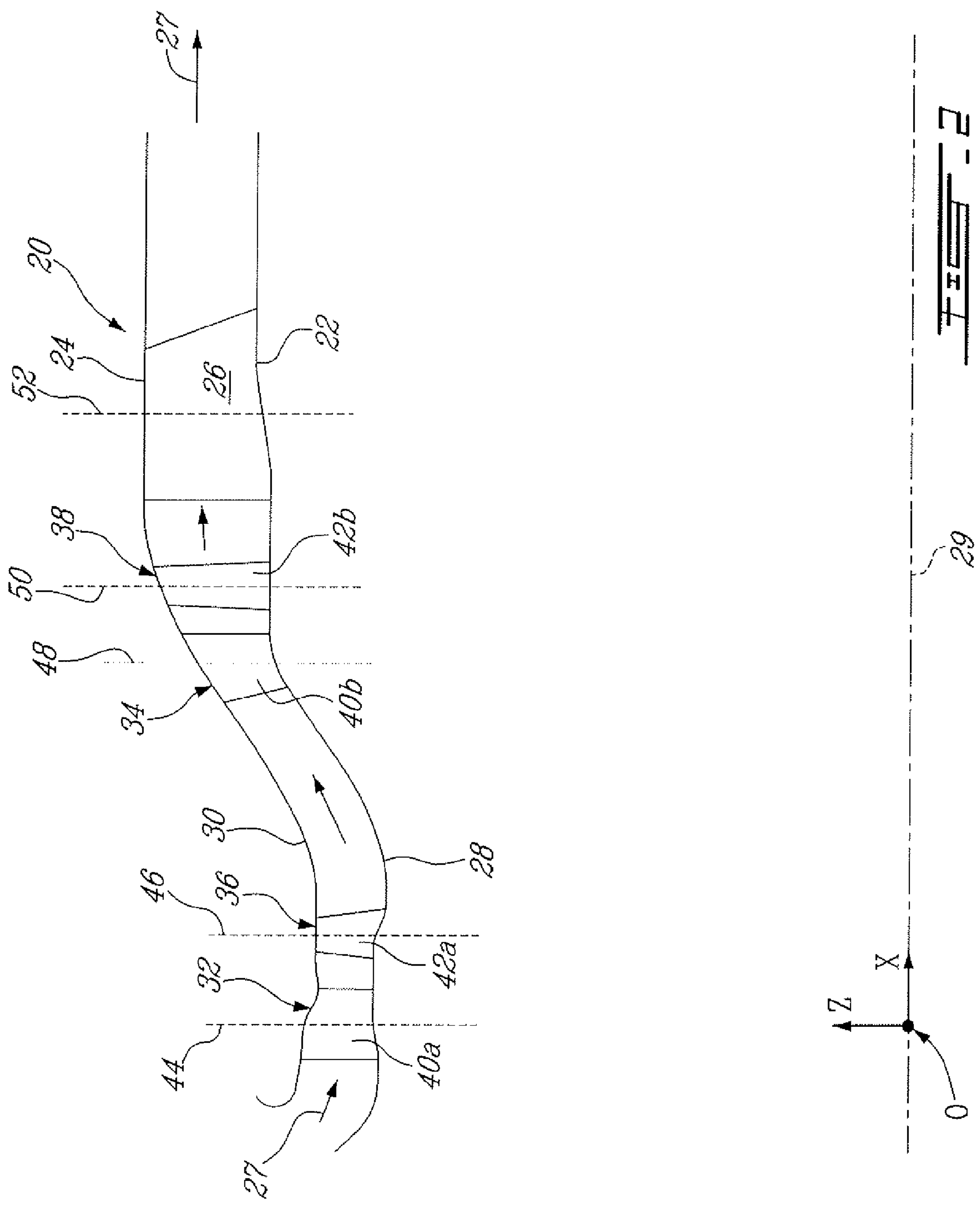
FIG. 2 is a schematic view of a gaspath of the gas turbine engine of FIG. 1, including a low pressure turbine stage.

FIG. 2 illustrates a portion of an annular hot gaspath, indicated by arrows 27 and defined by annular inner and outer walls 28 and 30 respectively, for directing the stream of hot combustion gases axially in an annular flow. The profile of the inner and outer walls 28 and 30 of the annular gaspath, at “cold” (i.e. non-operating) conditions, is defined by the Cartesian coordinate values given in Table 1 below. More particularly, the inner and outer gaspath walls 28 and 30 are defined with respect to orthogonally related x and z axes, as shown in FIG. 2. The x axis corresponds to the engine turbine rotor centerline 29. The radial distance of the inner and outer walls 28 and 30 from the engine turbine rotor centerline and, thus, from the x-axis at specific axial locations is measured along the z axis. The z coordinates provides the inner and outer radius of the gas path at various axial locations thereabout. The x and z coordinate values in Table 1 are distances given in inches from the point of origin O (see FIG. 2). It is understood that other units of dimensions may be used. The nominal x and z values given in Table 1 have a ±0.015" manufacturing tolerance between the leading edge and the trailing edge of the low pressure vanes.

A plurality of turbine stages of the turbine section 18 are shown in the gaspath 27, and more particularly a high pressure turbine (HPT) stage located downstream of the combustor 16 and a low pressure turbine (LPT) stage further downstream are exemplified. The turbine exhaust duct 20 is shown downstream from the LPT stage. The LP turbine has a single stage.

Referring to FIG. 2, the HPT stage is preferably transonic and comprises a stator assembly 32 and a rotor assembly 36 having a plurality of circumferentially arranged vane 40*a* and blades 42*a* respectively. Likewise, the LPT stage comprises a stator assembly 34 and a rotor assembly 38 having a plurality of circumferentially spaced vanes 40*b* and blades 42*b*. The vanes 40*a,b* and blades 42*a,b* are mounted in position along respective stacking lines 44-50, as identified in FIG. 2. The stacking lines 44-50 extend in the radial direction along the z axis at different axial locations. The stacking lines 44-50 define the axial location where the blades and vanes of each stage are mounted in the engine 10. More specifically, stacking line 44 located at x=0 corresponds to the HPT vane 40*a*. Stacking line 46 located at x=1.5143 corresponds to the HPT blade 42*a*. Stacking line 48 located at x=6.119 corresponds to the LPT vane 40*b*. Stacking line 50 located at x=7.396 corresponds to the LPT blade 42*b*. Furthermore, FIG. 2 also illustrates stacking line 52 corresponding to turbine exhaust duct strut 26. Stacking line 52 is located at x=10.335.

TABLE 1

| Turbine Cold Gaspath Definition | | | |
|---|---|---|---|
| Inner Gaspath | | Outer Gaspath | |
| Z | X | Z | X |
| 3.785 | −0.686 | 5.147 | −0.652 |
| 3.785 | −0.673 | 5.078 | −0.498 |
| 3.805 | −0.326 | 5.057 | −0.282 |
| 3.848 | 0 | 5.019 | 0 |
| 3.859 | 0.269 | 4.911 | 0.262 |
| 3.88 | 0.591 | 4.793 | 0.591 |
| 3.88 | 0.975 | 4.792 | 0.93 |
| 3.865 | 1.16 | 4.835 | 1.025 |
| 3.837 | 1.528 | 4.835 | 1.556 |
| 3.732 | 1.822 | 4.835 | 2.127 |
| 3.66 | 2.219 | 4.89 | 2.612 |
| 3.689 | 2.566 | 5 | 2.986 |
| 3.881 | 3.328 | 5.398 | 3.867 |
| 4.372 | 4.426 | 6.152 | 5.089 |
| 5.142 | 5.387 | 6.409 | 5.435 |
| 5.349 | 5.702 | 6.864 | 6.121 |
| 5.555 | 6.119 | 7.153 | 6.616 |
| 5.623 | 6.456 | 7.347 | 6.995 |
| 5.668 | 6.916 | 7.419 | 7.09 |
| 5.698 | 7.023 | 7.542 | 7.395 |
| 5.698 | 7.395 | 7.674 | 7.781 |
| 5.698 | 7.396 | 7.818 | 8.128 |
| 5.698 | 7.976 | 7.82 | 8.868 |
| 5.675 | 8.28 | 7.82 | 10.335 |
| 5.675 | 8.851 | 7.82 | 11.552 |
| 5.679 | 9.461 | 7.82 | 12.133 |
| 5.84 | 10.335 | | |
| 5.928 | 11.226 | | |
| 5.937 | 12.172 | | |
| 5.937 | 13.116 | | |

Figure 3:
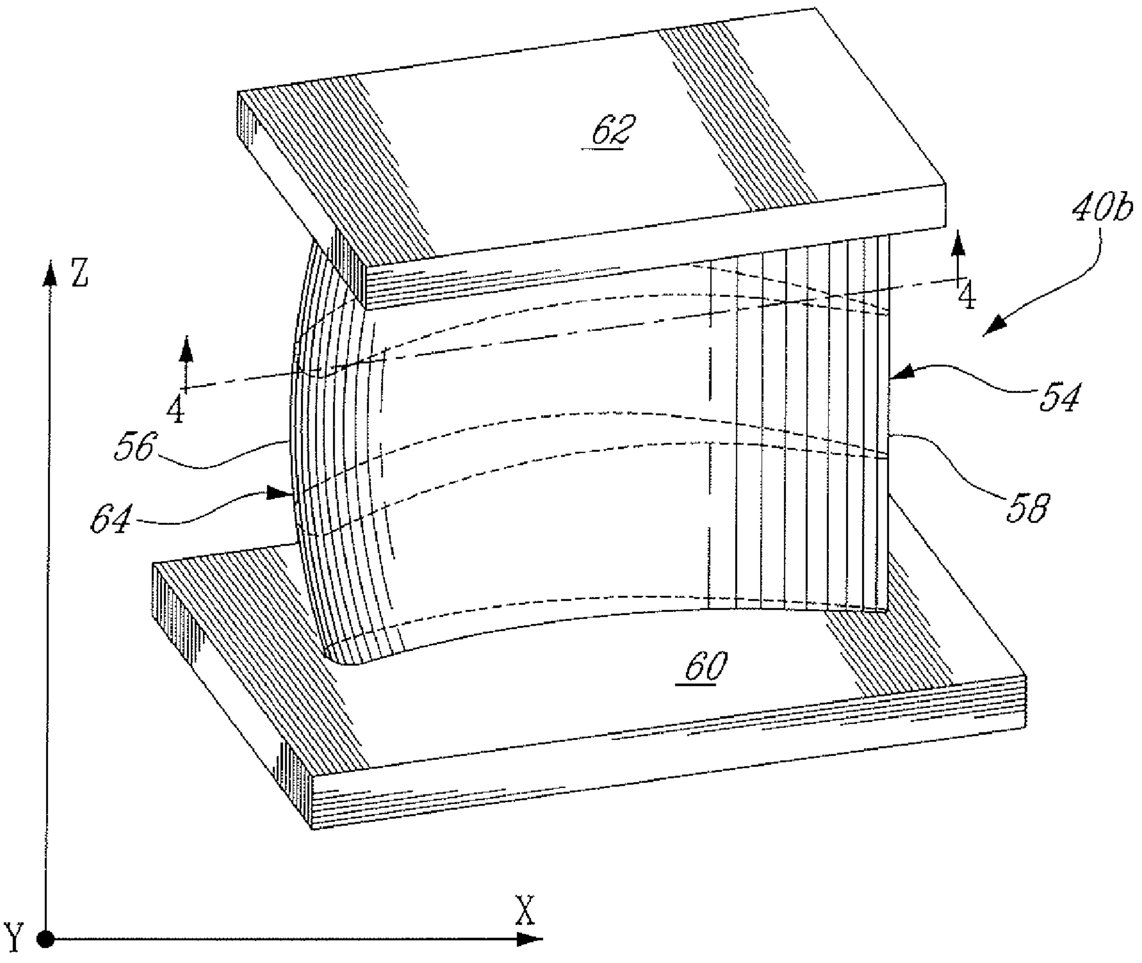
FIG. 3 is a very schematic elevation view of a LPT stage vane having a vane profile defined in accordance with an embodiment of the present invention.
Figure 4:
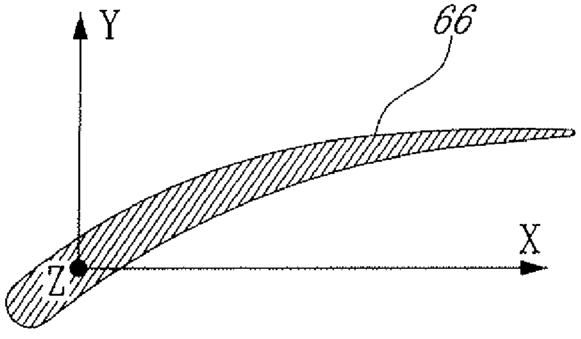
FIG. 4 is a cross sectional view taken along lines 4-4 of FIG. 3, showing a representative profile section of the airfoil portion of the vane.

More specifically, the stator assemblies 32, 34 each include the plurality of circumferentially distributed vanes 40*a* and 40*b* respectively which extend radially across the hot gaspath 27. The LPT stator assembly 32 comprises 50 vanes 40*b* that are uniformly circumferentially distributed. FIG. 3 shows an example of a vane 40*b* of the LPT stage. It can be seen that each vane 40*b* has an airfoil 54 having a leading edge 56 and a trailing edge 58, extending between inner vane platform 60 and outer vane platform 62. The HPT includes 14 HP vanes and 50 HP blades, the LPT include 50 LP vanes and 82 LP blades, and there are 14 thin and 1 thick airfoils in the turbine exhaust case.

The novel airfoil shape of each LPT stage vane 40*b* is defined by a set of X-Y-Z points in space. This set of points represents a novel and unique solution to the target design criteria discussed above, and is well-adapted for use in a single-stage LPT design. The set of points are defined in a Cartesian coordinate system which has mutually orthogonal X, Y and Z axes. The X axis extends axially along the turbine rotor centerline 29, i.e., the rotary axis. The positive X direction is axially towards the aft of the turbine engine 10. The Z axis extends along the LPT vane stacking line 48 of each respective vane 40 in a generally radial direction and intersects the X axis. The positive Z direction is radially outwardly toward the outer vane platform 62. The Y axis extends tangentially with the positive Y direction being in the direction of rotation of the rotor assembly 38. Therefore, the origin of the X, Y and Z axes is defined at the point of intersection of all three orthogonally-related axes: that is the point (0,0,0) at the intersection of the center of rotation of the turbine engine 10 and the staking line 48.

In a particular embodiment of the LPT stage, the set of points which define the LPT stage vane airfoil profile relative to the axis of rotation of the turbine engine 10 and the stacking line 48 thereof are set out in Table 2 below as X, Y and Z Cartesian coordinate values. Particularly, the vane airfoil profile is defined by profile sections 66 at various locations along its height, the locations represented by Z values. It should be understood that the Z values do not represent an actual radial height along the airfoil 54 but are defined with respect to the engine centerline. For example, if the vanes 40*b* are mounted about the stator assembly 34 at an angle with respect to the radial direction, then the Z values are not a true representation of the height of the airfoils of the vanes 40*b*. Furthermore, it is to be appreciated that, with respect to Table 2, Z values are not actually radial heights, per se, from the centerline but rather a height from a plane through the centerline—i.e. the sections in Table 2 are planar. The coordinate values are set forth in inches in Table 2 although other units of dimensions may be used when the values are appropriately converted.

Thus, at each Z distance, the X and Y coordinate values of the desired profile section 66 are defined at selected locations in a Z direction normal to the X, Y plane. The X and Y coordinates are given in distance dimensions, e.g., units of inches, and are joined smoothly, using appropriate curve-fitting techniques, at each Z location to form a continuous airfoil cross-section. The vane airfoil profiles of the various surface locations between the distances Z are determined by smoothly connecting the adjacent profile sections 66 to one another to form the airfoil profile.

The coordinate values listed in Table 2 below represent the desired airfoil profiles in a cold (i.e. "non-operating") condition. However, the manufactured airfoil surface profile will be slightly different as a result of manufacturing tolerances. The coordinate values listed in Table 2 below are for an uncoated airfoil. It is noted that according to an embodiment of the present invention, the vanes are not coated subsequent to being cast.

The Table 2 values are generated and shown to three decimal places for determining the profile of the LPT stage vane airfoil. However, as mentioned above, there are manufacturing tolerance issue to be addressed and, accordingly, the values for the profile given in Table 2 are for a theoretical airfoil to which a ±0.003 inches manufacturing tolerance is additive to the X and Y values given in Table 2 below. The LPT stage vane airfoil design functions well within this preferred range. The cold or room temperature profile is given by the X, Y and Z coordinates for manufacturing purposes. It is understood that the airfoil may deform, within acceptable limits, once entering service.

The coordinate values given in Table 2 below provide the preferred uncoated nominal LPT stage vane airfoil profile.

TABLE 2

| X | Y | Z |
|---|---|---|
| | SECTION 1 | |
| −0.379 | −0.284 | 5.225 |
| −0.376 | −0.284 | 5.225 |
| −0.373 | −0.283 | 5.225 |
| −0.370 | −0.283 | 5.225 |
| −0.367 | −0.282 | 5.225 |
| −0.365 | −0.282 | 5.225 |
| −0.362 | −0.281 | 5.225 |
| −0.359 | −0.281 | 5.225 |
| −0.356 | −0.280 | 5.225 |
| −0.353 | −0.280 | 5.225 |
| −0.351 | −0.279 | 5.225 |
| −0.337 | −0.277 | 5.225 |
| −0.323 | −0.274 | 5.225 |
| −0.309 | −0.270 | 5.225 |
| −0.295 | −0.267 | 5.225 |
| −0.282 | −0.264 | 5.225 |
| −0.268 | −0.260 | 5.225 |
| −0.254 | −0.256 | 5.225 |
| −0.241 | −0.252 | 5.225 |
| −0.227 | −0.248 | 5.225 |
| −0.214 | −0.244 | 5.225 |
| −0.200 | −0.239 | 5.225 |
| −0.187 | −0.234 | 5.225 |
| −0.173 | −0.230 | 5.225 |
| −0.160 | −0.225 | 5.225 |
| −0.147 | −0.220 | 5.225 |
| −0.134 | −0.214 | 5.225 |
| −0.121 | −0.209 | 5.225 |
| −0.108 | −0.204 | 5.225 |
| −0.095 | −0.198 | 5.225 |
| −0.082 | −0.192 | 5.225 |
| −0.069 | −0.186 | 5.225 |
| −0.056 | −0.179 | 5.225 |
| −0.044 | −0.173 | 5.225 |
| −0.031 | −0.166 | 5.225 |
| −0.019 | −0.159 | 5.225 |
| −0.007 | −0.152 | 5.225 |
| 0.005 | −0.145 | 5.225 |
| 0.017 | −0.137 | 5.225 |
| 0.029 | −0.129 | 5.225 |
| 0.040 | −0.121 | 5.225 |
| 0.052 | −0.112 | 5.225 |
| 0.063 | −0.103 | 5.225 |
| 0.074 | −0.094 | 5.225 |
| 0.084 | −0.085 | 5.225 |
| 0.095 | −0.075 | 5.225 |
| 0.105 | −0.065 | 5.225 |
| 0.115 | −0.055 | 5.225 |
| 0.125 | −0.045 | 5.225 |
| 0.134 | −0.035 | 5.225 |
| 0.144 | −0.024 | 5.225 |
| 0.153 | −0.013 | 5.225 |
| 0.162 | −0.002 | 5.225 |

TABLE 2-continued

| X | Y | Z |
|---|---|---|
| 0.171 | 0.008 | 5.225 |
| 0.180 | 0.019 | 5.225 |
| 0.189 | 0.030 | 5.225 |
| 0.198 | 0.041 | 5.225 |
| 0.207 | 0.053 | 5.225 |
| 0.216 | 0.064 | 5.225 |
| 0.224 | 0.075 | 5.225 |
| 0.233 | 0.086 | 5.225 |
| 0.242 | 0.097 | 5.225 |
| 0.250 | 0.108 | 5.225 |
| 0.259 | 0.120 | 5.225 |
| 0.268 | 0.131 | 5.225 |
| 0.276 | 0.142 | 5.225 |
| 0.285 | 0.154 | 5.225 |
| 0.293 | 0.165 | 5.225 |
| 0.302 | 0.176 | 5.225 |
| 0.310 | 0.187 | 5.225 |
| 0.319 | 0.199 | 5.225 |
| 0.327 | 0.210 | 5.225 |
| 0.336 | 0.222 | 5.225 |
| 0.344 | 0.233 | 5.225 |
| 0.352 | 0.245 | 5.225 |
| 0.361 | 0.256 | 5.225 |
| 0.369 | 0.268 | 5.225 |
| 0.377 | 0.279 | 5.225 |
| 0.385 | 0.291 | 5.225 |
| 0.394 | 0.302 | 5.225 |
| 0.402 | 0.314 | 5.225 |
| 0.410 | 0.325 | 5.225 |
| 0.418 | 0.337 | 5.225 |
| 0.426 | 0.349 | 5.225 |
| 0.434 | 0.360 | 5.225 |
| 0.442 | 0.372 | 5.225 |
| 0.450 | 0.384 | 5.225 |
| 0.458 | 0.396 | 5.225 |
| 0.466 | 0.407 | 5.225 |
| 0.473 | 0.419 | 5.225 |
| 0.475 | 0.422 | 5.225 |
| 0.476 | 0.424 | 5.225 |
| 0.478 | 0.426 | 5.225 |
| 0.480 | 0.429 | 5.225 |
| 0.481 | 0.431 | 5.225 |
| 0.483 | 0.434 | 5.225 |
| 0.484 | 0.436 | 5.225 |
| 0.486 | 0.438 | 5.225 |
| 0.487 | 0.441 | 5.225 |
| 0.489 | 0.443 | 5.225 |
| 0.490 | 0.445 | 5.225 |
| 0.490 | 0.447 | 5.225 |
| 0.491 | 0.449 | 5.225 |
| 0.491 | 0.451 | 5.225 |
| 0.490 | 0.453 | 5.225 |
| 0.490 | 0.455 | 5.225 |
| 0.489 | 0.457 | 5.225 |
| 0.488 | 0.458 | 5.225 |
| 0.486 | 0.460 | 5.225 |
| 0.485 | 0.461 | 5.225 |
| 0.483 | 0.462 | 5.225 |
| 0.481 | 0.463 | 5.225 |
| 0.479 | 0.463 | 5.225 |
| 0.477 | 0.463 | 5.225 |
| 0.475 | 0.463 | 5.225 |
| 0.473 | 0.462 | 5.225 |
| 0.472 | 0.461 | 5.225 |
| 0.470 | 0.460 | 5.225 |
| 0.469 | 0.459 | 5.225 |
| 0.467 | 0.456 | 5.225 |
| 0.465 | 0.454 | 5.225 |
| 0.464 | 0.452 | 5.225 |
| 0.462 | 0.450 | 5.225 |
| 0.460 | 0.448 | 5.225 |
| 0.459 | 0.446 | 5.225 |
| 0.457 | 0.443 | 5.225 |
| 0.455 | 0.441 | 5.225 |
| 0.454 | 0.439 | 5.225 |
| 0.452 | 0.437 | 5.225 |
| 0.444 | 0.426 | 5.225 |

TABLE 2-continued

| X | Y | Z |
|---|---|---|
| 0.437 | 0.414 | 5.225 |
| 0.429 | 0.403 | 5.225 |
| 0.421 | 0.391 | 5.225 |
| 0.414 | 0.380 | 5.225 |
| 0.407 | 0.368 | 5.225 |
| 0.399 | 0.357 | 5.225 |
| 0.392 | 0.345 | 5.225 |
| 0.385 | 0.334 | 5.225 |
| 0.377 | 0.322 | 5.225 |
| 0.370 | 0.311 | 5.225 |
| 0.362 | 0.300 | 5.225 |
| 0.354 | 0.288 | 5.225 |
| 0.347 | 0.277 | 5.225 |
| 0.339 | 0.266 | 5.225 |
| 0.331 | 0.255 | 5.225 |
| 0.323 | 0.244 | 5.225 |
| 0.315 | 0.233 | 5.225 |
| 0.306 | 0.222 | 5.225 |
| 0.298 | 0.211 | 5.225 |
| 0.289 | 0.200 | 5.225 |
| 0.281 | 0.190 | 5.225 |
| 0.272 | 0.180 | 5.225 |
| 0.263 | 0.169 | 5.225 |
| 0.254 | 0.159 | 5.225 |
| 0.244 | 0.149 | 5.225 |
| 0.235 | 0.139 | 5.225 |
| 0.225 | 0.129 | 5.225 |
| 0.216 | 0.120 | 5.225 |
| 0.206 | 0.110 | 5.225 |
| 0.196 | 0.101 | 5.225 |
| 0.186 | 0.091 | 5.225 |
| 0.176 | 0.082 | 5.225 |
| 0.165 | 0.073 | 5.225 |
| 0.155 | 0.064 | 5.225 |
| 0.145 | 0.056 | 5.225 |
| 0.134 | 0.047 | 5.225 |
| 0.123 | 0.038 | 5.225 |
| 0.113 | 0.030 | 5.225 |
| 0.102 | 0.022 | 5.225 |
| 0.091 | 0.014 | 5.225 |
| 0.080 | 0.005 | 5.225 |
| 0.068 | −0.002 | 5.225 |
| 0.057 | −0.010 | 5.225 |
| 0.046 | −0.018 | 5.225 |
| 0.035 | −0.026 | 5.225 |
| 0.023 | −0.033 | 5.225 |
| 0.012 | −0.041 | 5.225 |
| 0.000 | −0.048 | 5.225 |
| −0.011 | −0.055 | 5.225 |
| −0.023 | −0.062 | 5.225 |
| −0.035 | −0.069 | 5.225 |
| −0.046 | −0.077 | 5.225 |
| −0.058 | −0.084 | 5.225 |
| −0.070 | −0.090 | 5.225 |
| −0.082 | −0.097 | 5.225 |
| −0.094 | −0.104 | 5.225 |
| −0.106 | −0.111 | 5.225 |
| −0.118 | −0.117 | 5.225 |
| −0.130 | −0.124 | 5.225 |
| −0.142 | −0.130 | 5.225 |
| −0.154 | −0.136 | 5.225 |
| −0.166 | −0.143 | 5.225 |
| −0.178 | −0.149 | 5.225 |
| −0.191 | −0.155 | 5.225 |
| −0.203 | −0.161 | 5.225 |
| −0.215 | −0.167 | 5.225 |
| −0.228 | −0.173 | 5.225 |
| −0.240 | −0.178 | 5.225 |
| −0.252 | −0.184 | 5.225 |
| −0.265 | −0.190 | 5.225 |
| −0.277 | −0.195 | 5.225 |
| −0.290 | −0.201 | 5.225 |
| −0.302 | −0.207 | 5.225 |
| −0.315 | −0.212 | 5.225 |
| −0.327 | −0.218 | 5.225 |
| −0.339 | −0.224 | 5.225 |
| −0.352 | −0.230 | 5.225 |

TABLE 2-continued

| X | Y | Z |
|---|---|---|
| −0.364 | −0.236 | 5.225 |
| −0.366 | −0.237 | 5.225 |
| −0.369 | −0.239 | 5.225 |
| −0.371 | −0.240 | 5.225 |
| −0.374 | −0.241 | 5.225 |
| −0.376 | −0.242 | 5.225 |
| −0.378 | −0.244 | 5.225 |
| −0.381 | −0.245 | 5.225 |
| −0.383 | −0.246 | 5.225 |
| −0.386 | −0.248 | 5.225 |
| −0.388 | −0.249 | 5.225 |
| −0.391 | −0.251 | 5.225 |
| −0.393 | −0.253 | 5.225 |
| −0.395 | −0.255 | 5.225 |
| −0.398 | −0.257 | 5.225 |
| −0.400 | −0.259 | 5.225 |
| −0.401 | −0.262 | 5.225 |
| −0.402 | −0.265 | 5.225 |
| −0.403 | −0.268 | 5.225 |
| −0.403 | −0.271 | 5.225 |
| −0.402 | −0.274 | 5.225 |
| −0.401 | −0.277 | 5.225 |
| −0.399 | −0.280 | 5.225 |
| −0.397 | −0.281 | 5.225 |
| −0.394 | −0.283 | 5.225 |
| −0.391 | −0.284 | 5.225 |
| −0.388 | −0.284 | 5.225 |
| −0.385 | −0.285 | 5.225 |
| −0.382 | −0.285 | 5.225 |
| | SECTION 2 | |
| −0.394 | −0.301 | 5.455 |
| −0.391 | −0.301 | 5.455 |
| −0.388 | −0.300 | 5.455 |
| −0.385 | −0.300 | 5.455 |
| −0.382 | −0.299 | 5.455 |
| −0.379 | −0.299 | 5.455 |
| −0.376 | −0.298 | 5.455 |
| −0.373 | −0.298 | 5.455 |
| −0.370 | −0.297 | 5.455 |
| −0.367 | −0.297 | 5.455 |
| −0.364 | −0.296 | 5.455 |
| −0.350 | −0.293 | 5.455 |
| −0.335 | −0.290 | 5.455 |
| −0.321 | −0.286 | 5.455 |
| −0.306 | −0.282 | 5.455 |
| −0.292 | −0.278 | 5.455 |
| −0.278 | −0.273 | 5.455 |
| −0.264 | −0.269 | 5.455 |
| −0.250 | −0.264 | 5.455 |
| −0.236 | −0.259 | 5.455 |
| −0.222 | −0.253 | 5.455 |
| −0.208 | −0.248 | 5.455 |
| −0.194 | −0.242 | 5.455 |
| −0.181 | −0.236 | 5.455 |
| −0.167 | −0.229 | 5.455 |
| −0.154 | −0.223 | 5.455 |
| −0.141 | −0.216 | 5.455 |
| −0.127 | −0.210 | 5.455 |
| −0.114 | −0.202 | 5.455 |
| −0.102 | −0.195 | 5.455 |
| −0.088 | −0.188 | 5.455 |
| −0.076 | −0.180 | 5.455 |
| −0.063 | −0.172 | 5.455 |
| −0.050 | −0.164 | 5.455 |
| −0.038 | −0.156 | 5.455 |
| −0.026 | −0.148 | 5.455 |
| −0.013 | −0.139 | 5.455 |
| −0.001 | −0.130 | 5.455 |
| 0.010 | −0.121 | 5.455 |
| 0.022 | −0.112 | 5.455 |
| 0.033 | −0.103 | 5.455 |
| 0.045 | −0.093 | 5.455 |
| 0.056 | −0.083 | 5.455 |
| 0.067 | −0.073 | 5.455 |
| 0.078 | −0.063 | 5.455 |
| 0.088 | −0.052 | 5.455 |

TABLE 2-continued

| X | Y | Z |
|---|---|---|
| 0.098 | −0.042 | 5.455 |
| 0.109 | −0.031 | 5.455 |
| 0.119 | −0.020 | 5.455 |
| 0.128 | −0.008 | 5.455 |
| 0.138 | 0.003 | 5.455 |
| 0.148 | 0.014 | 5.455 |
| 0.157 | 0.026 | 5.455 |
| 0.167 | 0.037 | 5.455 |
| 0.176 | 0.049 | 5.455 |
| 0.185 | 0.061 | 5.455 |
| 0.194 | 0.072 | 5.455 |
| 0.203 | 0.084 | 5.455 |
| 0.212 | 0.096 | 5.455 |
| 0.221 | 0.108 | 5.455 |
| 0.230 | 0.120 | 5.455 |
| 0.239 | 0.132 | 5.455 |
| 0.248 | 0.144 | 5.455 |
| 0.257 | 0.155 | 5.455 |
| 0.266 | 0.167 | 5.455 |
| 0.275 | 0.179 | 5.455 |
| 0.284 | 0.191 | 5.455 |
| 0.292 | 0.203 | 5.455 |
| 0.301 | 0.216 | 5.455 |
| 0.310 | 0.228 | 5.455 |
| 0.318 | 0.240 | 5.455 |
| 0.327 | 0.252 | 5.455 |
| 0.335 | 0.264 | 5.455 |
| 0.344 | 0.276 | 5.455 |
| 0.353 | 0.288 | 5.455 |
| 0.361 | 0.301 | 5.455 |
| 0.369 | 0.313 | 5.455 |
| 0.378 | 0.325 | 5.455 |
| 0.386 | 0.338 | 5.455 |
| 0.394 | 0.350 | 5.455 |
| 0.403 | 0.362 | 5.455 |
| 0.411 | 0.375 | 5.455 |
| 0.419 | 0.387 | 5.455 |
| 0.427 | 0.400 | 5.455 |
| 0.435 | 0.412 | 5.455 |
| 0.443 | 0.425 | 5.455 |
| 0.451 | 0.438 | 5.455 |
| 0.459 | 0.450 | 5.455 |
| 0.466 | 0.463 | 5.455 |
| 0.474 | 0.476 | 5.455 |
| 0.476 | 0.478 | 5.455 |
| 0.477 | 0.481 | 5.455 |
| 0.479 | 0.483 | 5.455 |
| 0.480 | 0.486 | 5.455 |
| 0.482 | 0.488 | 5.455 |
| 0.483 | 0.491 | 5.455 |
| 0.485 | 0.494 | 5.455 |
| 0.486 | 0.496 | 5.455 |
| 0.488 | 0.499 | 5.455 |
| 0.489 | 0.501 | 5.455 |
| 0.490 | 0.503 | 5.455 |
| 0.491 | 0.505 | 5.455 |
| 0.491 | 0.507 | 5.455 |
| 0.491 | 0.509 | 5.455 |
| 0.491 | 0.511 | 5.455 |
| 0.490 | 0.513 | 5.455 |
| 0.489 | 0.515 | 5.455 |
| 0.488 | 0.516 | 5.455 |
| 0.487 | 0.518 | 5.455 |
| 0.485 | 0.519 | 5.455 |
| 0.483 | 0.520 | 5.455 |
| 0.481 | 0.521 | 5.455 |
| 0.479 | 0.521 | 5.455 |
| 0.478 | 0.521 | 5.455 |
| 0.476 | 0.521 | 5.455 |
| 0.474 | 0.520 | 5.455 |
| 0.472 | 0.519 | 5.455 |
| 0.470 | 0.518 | 5.455 |
| 0.469 | 0.516 | 5.455 |
| 0.467 | 0.514 | 5.455 |
| 0.466 | 0.512 | 5.455 |
| 0.464 | 0.509 | 5.455 |
| 0.463 | 0.507 | 5.455 |

TABLE 2-continued

| X | Y | Z |
|---|---|---|
| 0.461 | 0.504 | 5.455 |
| 0.459 | 0.502 | 5.455 |
| 0.458 | 0.500 | 5.455 |
| 0.456 | 0.497 | 5.455 |
| 0.455 | 0.495 | 5.455 |
| 0.453 | 0.493 | 5.455 |
| 0.445 | 0.481 | 5.455 |
| 0.437 | 0.469 | 5.455 |
| 0.430 | 0.457 | 5.455 |
| 0.422 | 0.445 | 5.455 |
| 0.415 | 0.433 | 5.455 |
| 0.407 | 0.420 | 5.455 |
| 0.399 | 0.408 | 5.455 |
| 0.392 | 0.396 | 5.455 |
| 0.384 | 0.384 | 5.455 |
| 0.376 | 0.372 | 5.455 |
| 0.368 | 0.360 | 5.455 |
| 0.361 | 0.348 | 5.455 |
| 0.353 | 0.336 | 5.455 |
| 0.345 | 0.324 | 5.455 |
| 0.337 | 0.312 | 5.455 |
| 0.328 | 0.301 | 5.455 |
| 0.320 | 0.289 | 5.455 |
| 0.311 | 0.277 | 5.455 |
| 0.303 | 0.266 | 5.455 |
| 0.294 | 0.255 | 5.455 |
| 0.285 | 0.243 | 5.455 |
| 0.276 | 0.232 | 5.455 |
| 0.267 | 0.221 | 5.455 |
| 0.258 | 0.210 | 5.455 |
| 0.249 | 0.199 | 5.455 |
| 0.239 | 0.189 | 5.455 |
| 0.230 | 0.178 | 5.455 |
| 0.220 | 0.167 | 5.455 |
| 0.210 | 0.157 | 5.455 |
| 0.200 | 0.147 | 5.455 |
| 0.190 | 0.137 | 5.455 |
| 0.180 | 0.126 | 5.455 |
| 0.170 | 0.116 | 5.455 |
| 0.159 | 0.107 | 5.455 |
| 0.149 | 0.097 | 5.455 |
| 0.138 | 0.087 | 5.455 |
| 0.128 | 0.078 | 5.455 |
| 0.117 | 0.068 | 5.455 |
| 0.106 | 0.059 | 5.455 |
| 0.095 | 0.050 | 5.455 |
| 0.084 | 0.041 | 5.455 |
| 0.073 | 0.031 | 5.455 |
| 0.062 | 0.023 | 5.455 |
| 0.051 | 0.014 | 5.455 |
| 0.039 | 0.005 | 5.455 |
| 0.028 | −0.004 | 5.455 |
| 0.016 | −0.012 | 5.455 |
| 0.005 | −0.021 | 5.455 |
| −0.007 | −0.029 | 5.455 |
| −0.019 | −0.037 | 5.455 |
| −0.030 | −0.045 | 5.455 |
| −0.042 | −0.053 | 5.455 |
| −0.054 | −0.061 | 5.455 |
| −0.066 | −0.069 | 5.455 |
| −0.078 | −0.077 | 5.455 |
| −0.090 | −0.085 | 5.455 |
| −0.102 | −0.092 | 5.455 |
| −0.114 | −0.100 | 5.455 |
| −0.127 | −0.107 | 5.455 |
| −0.139 | −0.114 | 5.455 |
| −0.151 | −0.121 | 5.455 |
| −0.164 | −0.128 | 5.455 |
| −0.176 | −0.135 | 5.455 |
| −0.189 | −0.142 | 5.455 |
| −0.202 | −0.149 | 5.455 |
| −0.214 | −0.156 | 5.455 |
| −0.227 | −0.162 | 5.455 |
| −0.240 | −0.168 | 5.455 |
| −0.253 | −0.175 | 5.455 |
| −0.265 | −0.181 | 5.455 |
| −0.278 | −0.187 | 5.455 |

TABLE 2-continued

| X | Y | Z |
|---|---|---|
| −0.291 | −0.194 | 5.455 |
| −0.304 | −0.200 | 5.455 |
| −0.317 | −0.206 | 5.455 |
| −0.330 | −0.213 | 5.455 |
| −0.343 | −0.219 | 5.455 |
| −0.355 | −0.226 | 5.455 |
| −0.368 | −0.232 | 5.455 |
| −0.380 | −0.239 | 5.455 |
| −0.383 | −0.241 | 5.455 |
| −0.385 | −0.242 | 5.455 |
| −0.388 | −0.243 | 5.455 |
| −0.390 | −0.245 | 5.455 |
| −0.393 | −0.246 | 5.455 |
| −0.395 | −0.248 | 5.455 |
| −0.398 | −0.249 | 5.455 |
| −0.400 | −0.251 | 5.455 |
| −0.403 | −0.252 | 5.455 |
| −0.405 | −0.254 | 5.455 |
| −0.408 | −0.256 | 5.455 |
| −0.411 | −0.259 | 5.455 |
| −0.414 | −0.262 | 5.455 |
| −0.417 | −0.265 | 5.455 |
| −0.420 | −0.268 | 5.455 |
| −0.422 | −0.272 | 5.455 |
| −0.423 | −0.275 | 5.455 |
| −0.424 | −0.279 | 5.455 |
| −0.425 | −0.283 | 5.455 |
| −0.424 | −0.287 | 5.455 |
| −0.423 | −0.291 | 5.455 |
| −0.420 | −0.295 | 5.455 |
| −0.417 | −0.297 | 5.455 |
| −0.414 | −0.299 | 5.455 |
| −0.410 | −0.301 | 5.455 |
| −0.406 | −0.301 | 5.455 |
| −0.402 | −0.302 | 5.455 |
| −0.398 | −0.302 | 5.455 |
| | SECTION 3 | |
| −0.422 | −0.324 | 5.685 |
| −0.418 | −0.324 | 5.685 |
| −0.415 | −0.323 | 5.685 |
| −0.412 | −0.323 | 5.685 |
| −0.409 | −0.322 | 5.685 |
| −0.406 | −0.322 | 5.685 |
| −0.403 | −0.321 | 5.685 |
| −0.400 | −0.321 | 5.685 |
| −0.397 | −0.320 | 5.685 |
| −0.394 | −0.319 | 5.685 |
| −0.390 | −0.319 | 5.685 |
| −0.375 | −0.315 | 5.685 |
| −0.360 | −0.312 | 5.685 |
| −0.344 | −0.308 | 5.685 |
| −0.329 | −0.303 | 5.685 |
| −0.314 | −0.298 | 5.685 |
| −0.299 | −0.293 | 5.685 |
| −0.284 | −0.288 | 5.685 |
| −0.270 | −0.282 | 5.685 |
| −0.255 | −0.276 | 5.685 |
| −0.240 | −0.270 | 5.685 |
| −0.226 | −0.263 | 5.685 |
| −0.212 | −0.256 | 5.685 |
| −0.198 | −0.249 | 5.685 |
| −0.184 | −0.242 | 5.685 |
| −0.170 | −0.234 | 5.685 |
| −0.156 | −0.226 | 5.685 |
| −0.143 | −0.218 | 5.685 |
| −0.129 | −0.210 | 5.685 |
| −0.116 | −0.201 | 5.685 |
| −0.103 | −0.193 | 5.685 |
| −0.090 | −0.183 | 5.685 |
| −0.077 | −0.174 | 5.685 |
| −0.064 | −0.165 | 5.685 |
| −0.051 | −0.155 | 5.685 |
| −0.039 | −0.146 | 5.685 |
| −0.027 | −0.136 | 5.685 |
| −0.015 | −0.125 | 5.685 |
| −0.003 | −0.115 | 5.685 |

TABLE 2-continued

| X | Y | Z |
|---|---|---|
| 0.009 | −0.105 | 5.685 |
| 0.021 | −0.094 | 5.685 |
| 0.033 | −0.083 | 5.685 |
| 0.044 | −0.072 | 5.685 |
| 0.055 | −0.061 | 5.685 |
| 0.066 | −0.050 | 5.685 |
| 0.077 | −0.038 | 5.685 |
| 0.087 | −0.026 | 5.685 |
| 0.098 | −0.014 | 5.685 |
| 0.108 | −0.003 | 5.685 |
| 0.119 | 0.010 | 5.685 |
| 0.129 | 0.022 | 5.685 |
| 0.139 | 0.034 | 5.685 |
| 0.148 | 0.046 | 5.685 |
| 0.158 | 0.059 | 5.685 |
| 0.168 | 0.071 | 5.685 |
| 0.178 | 0.084 | 5.685 |
| 0.187 | 0.097 | 5.685 |
| 0.197 | 0.109 | 5.685 |
| 0.206 | 0.122 | 5.685 |
| 0.215 | 0.135 | 5.685 |
| 0.225 | 0.147 | 5.685 |
| 0.234 | 0.160 | 5.685 |
| 0.243 | 0.173 | 5.685 |
| 0.253 | 0.186 | 5.685 |
| 0.262 | 0.199 | 5.685 |
| 0.271 | 0.212 | 5.685 |
| 0.280 | 0.225 | 5.685 |
| 0.289 | 0.237 | 5.685 |
| 0.298 | 0.250 | 5.685 |
| 0.307 | 0.264 | 5.685 |
| 0.316 | 0.277 | 5.685 |
| 0.325 | 0.290 | 5.685 |
| 0.334 | 0.303 | 5.685 |
| 0.342 | 0.316 | 5.685 |
| 0.351 | 0.329 | 5.685 |
| 0.360 | 0.342 | 5.685 |
| 0.368 | 0.356 | 5.685 |
| 0.377 | 0.369 | 5.685 |
| 0.385 | 0.382 | 5.685 |
| 0.394 | 0.396 | 5.685 |
| 0.402 | 0.409 | 5.685 |
| 0.411 | 0.423 | 5.685 |
| 0.419 | 0.436 | 5.685 |
| 0.427 | 0.450 | 5.685 |
| 0.435 | 0.463 | 5.685 |
| 0.443 | 0.477 | 5.685 |
| 0.451 | 0.490 | 5.685 |
| 0.459 | 0.504 | 5.685 |
| 0.467 | 0.518 | 5.685 |
| 0.475 | 0.532 | 5.685 |
| 0.476 | 0.534 | 5.685 |
| 0.478 | 0.537 | 5.685 |
| 0.479 | 0.540 | 5.685 |
| 0.481 | 0.543 | 5.685 |
| 0.482 | 0.546 | 5.685 |
| 0.484 | 0.548 | 5.685 |
| 0.485 | 0.551 | 5.685 |
| 0.487 | 0.554 | 5.685 |
| 0.488 | 0.557 | 5.685 |
| 0.490 | 0.559 | 5.685 |
| 0.491 | 0.561 | 5.685 |
| 0.491 | 0.563 | 5.685 |
| 0.491 | 0.565 | 5.685 |
| 0.491 | 0.567 | 5.685 |
| 0.491 | 0.569 | 5.685 |
| 0.490 | 0.571 | 5.685 |
| 0.489 | 0.573 | 5.685 |
| 0.488 | 0.574 | 5.685 |
| 0.487 | 0.576 | 5.685 |
| 0.485 | 0.577 | 5.685 |
| 0.484 | 0.578 | 5.685 |
| 0.482 | 0.579 | 5.685 |
| 0.480 | 0.579 | 5.685 |
| 0.478 | 0.579 | 5.685 |
| 0.476 | 0.579 | 5.685 |
| 0.474 | 0.578 | 5.685 |

TABLE 2-continued

| X | Y | Z |
|---|---|---|
| 0.472 | 0.577 | 5.685 |
| 0.471 | 0.575 | 5.685 |
| 0.470 | 0.574 | 5.685 |
| 0.468 | 0.571 | 5.685 |
| 0.466 | 0.569 | 5.685 |
| 0.465 | 0.566 | 5.685 |
| 0.463 | 0.564 | 5.685 |
| 0.462 | 0.561 | 5.685 |
| 0.460 | 0.558 | 5.685 |
| 0.458 | 0.556 | 5.685 |
| 0.457 | 0.553 | 5.685 |
| 0.455 | 0.551 | 5.685 |
| 0.454 | 0.548 | 5.685 |
| 0.446 | 0.535 | 5.685 |
| 0.438 | 0.522 | 5.685 |
| 0.430 | 0.509 | 5.685 |
| 0.422 | 0.496 | 5.685 |
| 0.414 | 0.483 | 5.685 |
| 0.406 | 0.470 | 5.685 |
| 0.399 | 0.458 | 5.685 |
| 0.391 | 0.445 | 5.685 |
| 0.383 | 0.432 | 5.685 |
| 0.374 | 0.419 | 5.685 |
| 0.366 | 0.406 | 5.685 |
| 0.358 | 0.394 | 5.685 |
| 0.350 | 0.381 | 5.685 |
| 0.341 | 0.368 | 5.685 |
| 0.333 | 0.356 | 5.685 |
| 0.324 | 0.343 | 5.685 |
| 0.315 | 0.331 | 5.685 |
| 0.307 | 0.319 | 5.685 |
| 0.298 | 0.307 | 5.685 |
| 0.289 | 0.294 | 5.685 |
| 0.279 | 0.282 | 5.685 |
| 0.270 | 0.270 | 5.685 |
| 0.261 | 0.259 | 5.685 |
| 0.251 | 0.247 | 5.685 |
| 0.241 | 0.235 | 5.685 |
| 0.232 | 0.224 | 5.685 |
| 0.222 | 0.212 | 5.685 |
| 0.212 | 0.201 | 5.685 |
| 0.202 | 0.189 | 5.685 |
| 0.192 | 0.178 | 5.685 |
| 0.181 | 0.167 | 5.685 |
| 0.171 | 0.156 | 5.685 |
| 0.160 | 0.145 | 5.685 |
| 0.150 | 0.134 | 5.685 |
| 0.139 | 0.124 | 5.685 |
| 0.128 | 0.113 | 5.685 |
| 0.117 | 0.103 | 5.685 |
| 0.106 | 0.092 | 5.685 |
| 0.095 | 0.082 | 5.685 |
| 0.084 | 0.072 | 5.685 |
| 0.073 | 0.061 | 5.685 |
| 0.062 | 0.051 | 5.685 |
| 0.050 | 0.041 | 5.685 |
| 0.039 | 0.032 | 5.685 |
| 0.027 | 0.022 | 5.685 |
| 0.015 | 0.012 | 5.685 |
| 0.004 | 0.003 | 5.685 |
| −0.008 | −0.007 | 5.685 |
| −0.020 | −0.016 | 5.685 |
| −0.032 | −0.025 | 5.685 |
| −0.044 | −0.034 | 5.685 |
| −0.056 | −0.043 | 5.685 |
| −0.069 | −0.052 | 5.685 |
| −0.081 | −0.061 | 5.685 |
| −0.094 | −0.070 | 5.685 |
| −0.106 | −0.078 | 5.685 |
| −0.119 | −0.086 | 5.685 |
| −0.131 | −0.095 | 5.685 |
| −0.144 | −0.103 | 5.685 |
| −0.157 | −0.111 | 5.685 |
| −0.170 | −0.119 | 5.685 |
| −0.183 | −0.126 | 5.685 |
| −0.196 | −0.134 | 5.685 |
| −0.209 | −0.142 | 5.685 |

TABLE 2-continued

| X | Y | Z |
|---|---|---|
| −0.222 | −0.149 | 5.685 |
| −0.236 | −0.156 | 5.685 |
| −0.249 | −0.163 | 5.685 |
| −0.262 | −0.171 | 5.685 |
| −0.276 | −0.178 | 5.685 |
| −0.289 | −0.185 | 5.685 |
| −0.303 | −0.192 | 5.685 |
| −0.316 | −0.199 | 5.685 |
| −0.330 | −0.205 | 5.685 |
| −0.343 | −0.213 | 5.685 |
| −0.356 | −0.220 | 5.685 |
| −0.370 | −0.227 | 5.685 |
| −0.383 | −0.234 | 5.685 |
| −0.396 | −0.242 | 5.685 |
| −0.409 | −0.249 | 5.685 |
| −0.412 | −0.251 | 5.685 |
| −0.414 | −0.253 | 5.685 |
| −0.417 | −0.254 | 5.685 |
| −0.419 | −0.256 | 5.685 |
| −0.422 | −0.257 | 5.685 |
| −0.424 | −0.259 | 5.685 |
| −0.427 | −0.261 | 5.685 |
| −0.429 | −0.262 | 5.685 |
| −0.432 | −0.264 | 5.685 |
| −0.435 | −0.266 | 5.685 |
| −0.439 | −0.269 | 5.685 |
| −0.442 | −0.272 | 5.685 |
| −0.446 | −0.275 | 5.685 |
| −0.449 | −0.279 | 5.685 |
| −0.452 | −0.283 | 5.685 |
| −0.455 | −0.288 | 5.685 |
| −0.457 | −0.292 | 5.685 |
| −0.458 | −0.297 | 5.685 |
| −0.459 | −0.302 | 5.685 |
| −0.458 | −0.307 | 5.685 |
| −0.457 | −0.312 | 5.685 |
| −0.454 | −0.316 | 5.685 |
| −0.450 | −0.319 | 5.685 |
| −0.446 | −0.322 | 5.685 |
| −0.441 | −0.324 | 5.685 |
| −0.437 | −0.325 | 5.685 |
| −0.432 | −0.325 | 5.685 |
| −0.427 | −0.325 | 5.685 |
| | SECTION 4 | |
| −0.443 | −0.340 | 5.815 |
| −0.440 | −0.340 | 5.815 |
| −0.437 | −0.339 | 5.815 |
| −0.434 | −0.339 | 5.815 |
| −0.430 | −0.338 | 5.815 |
| −0.427 | −0.338 | 5.815 |
| −0.424 | −0.337 | 5.815 |
| −0.421 | −0.336 | 5.815 |
| −0.418 | −0.336 | 5.815 |
| −0.414 | −0.335 | 5.815 |
| −0.411 | −0.334 | 5.815 |
| −0.395 | −0.331 | 5.815 |
| −0.379 | −0.327 | 5.815 |
| −0.363 | −0.323 | 5.815 |
| −0.347 | −0.318 | 5.815 |
| −0.332 | −0.313 | 5.815 |
| −0.316 | −0.308 | 5.815 |
| −0.301 | −0.302 | 5.815 |
| −0.286 | −0.296 | 5.815 |
| −0.270 | −0.289 | 5.815 |
| −0.255 | −0.283 | 5.815 |
| −0.241 | −0.275 | 5.815 |
| −0.226 | −0.268 | 5.815 |
| −0.211 | −0.260 | 5.815 |
| −0.197 | −0.252 | 5.815 |
| −0.183 | −0.244 | 5.815 |
| −0.169 | −0.236 | 5.815 |
| −0.155 | −0.227 | 5.815 |
| −0.141 | −0.218 | 5.815 |
| −0.127 | −0.209 | 5.815 |
| −0.114 | −0.199 | 5.815 |
| −0.101 | −0.189 | 5.815 |

TABLE 2-continued

| X | Y | Z |
|---|---|---|
| −0.088 | −0.180 | 5.815 |
| −0.075 | −0.169 | 5.815 |
| −0.062 | −0.159 | 5.815 |
| −0.049 | −0.149 | 5.815 |
| −0.037 | −0.138 | 5.815 |
| −0.024 | −0.127 | 5.815 |
| −0.012 | −0.116 | 5.815 |
| 0.000 | −0.105 | 5.815 |
| 0.012 | −0.093 | 5.815 |
| 0.023 | −0.082 | 5.815 |
| 0.035 | −0.070 | 5.815 |
| 0.046 | −0.058 | 5.815 |
| 0.058 | −0.046 | 5.815 |
| 0.069 | −0.034 | 5.815 |
| 0.080 | −0.022 | 5.815 |
| 0.090 | −0.009 | 5.815 |
| 0.101 | 0.003 | 5.815 |
| 0.111 | 0.016 | 5.815 |
| 0.122 | 0.029 | 5.815 |
| 0.132 | 0.042 | 5.815 |
| 0.142 | 0.054 | 5.815 |
| 0.152 | 0.067 | 5.815 |
| 0.162 | 0.081 | 5.815 |
| 0.172 | 0.094 | 5.815 |
| 0.182 | 0.107 | 5.815 |
| 0.192 | 0.120 | 5.815 |
| 0.201 | 0.133 | 5.815 |
| 0.211 | 0.147 | 5.815 |
| 0.221 | 0.160 | 5.815 |
| 0.230 | 0.174 | 5.815 |
| 0.240 | 0.187 | 5.815 |
| 0.249 | 0.200 | 5.815 |
| 0.258 | 0.214 | 5.815 |
| 0.268 | 0.227 | 5.815 |
| 0.277 | 0.241 | 5.815 |
| 0.286 | 0.255 | 5.815 |
| 0.296 | 0.268 | 5.815 |
| 0.305 | 0.282 | 5.815 |
| 0.314 | 0.296 | 5.815 |
| 0.323 | 0.309 | 5.815 |
| 0.332 | 0.323 | 5.815 |
| 0.341 | 0.337 | 5.815 |
| 0.350 | 0.351 | 5.815 |
| 0.359 | 0.364 | 5.815 |
| 0.367 | 0.378 | 5.815 |
| 0.376 | 0.392 | 5.815 |
| 0.385 | 0.406 | 5.815 |
| 0.393 | 0.420 | 5.815 |
| 0.402 | 0.434 | 5.815 |
| 0.410 | 0.449 | 5.815 |
| 0.419 | 0.463 | 5.815 |
| 0.427 | 0.477 | 5.815 |
| 0.435 | 0.491 | 5.815 |
| 0.443 | 0.505 | 5.815 |
| 0.451 | 0.520 | 5.815 |
| 0.459 | 0.534 | 5.815 |
| 0.467 | 0.549 | 5.815 |
| 0.475 | 0.563 | 5.815 |
| 0.476 | 0.566 | 5.815 |
| 0.478 | 0.569 | 5.815 |
| 0.479 | 0.572 | 5.815 |
| 0.481 | 0.575 | 5.815 |
| 0.482 | 0.578 | 5.815 |
| 0.484 | 0.581 | 5.815 |
| 0.486 | 0.584 | 5.815 |
| 0.487 | 0.586 | 5.815 |
| 0.489 | 0.589 | 5.815 |
| 0.490 | 0.592 | 5.815 |
| 0.491 | 0.594 | 5.815 |
| 0.491 | 0.596 | 5.815 |
| 0.491 | 0.598 | 5.815 |
| 0.491 | 0.600 | 5.815 |
| 0.491 | 0.602 | 5.815 |
| 0.490 | 0.604 | 5.815 |
| 0.489 | 0.606 | 5.815 |
| 0.488 | 0.607 | 5.815 |
| 0.487 | 0.609 | 5.815 |

TABLE 2-continued

| X | Y | Z |
|---|---|---|
| 0.485 | 0.610 | 5.815 |
| 0.484 | 0.611 | 5.815 |
| 0.482 | 0.611 | 5.815 |
| 0.480 | 0.612 | 5.815 |
| 0.478 | 0.612 | 5.815 |
| 0.476 | 0.611 | 5.815 |
| 0.474 | 0.610 | 5.815 |
| 0.472 | 0.609 | 5.815 |
| 0.471 | 0.608 | 5.815 |
| 0.470 | 0.606 | 5.815 |
| 0.468 | 0.604 | 5.815 |
| 0.467 | 0.601 | 5.815 |
| 0.465 | 0.598 | 5.815 |
| 0.463 | 0.596 | 5.815 |
| 0.462 | 0.593 | 5.815 |
| 0.460 | 0.590 | 5.815 |
| 0.459 | 0.587 | 5.815 |
| 0.457 | 0.585 | 5.815 |
| 0.456 | 0.582 | 5.815 |
| 0.454 | 0.579 | 5.815 |
| 0.446 | 0.566 | 5.815 |
| 0.438 | 0.552 | 5.815 |
| 0.430 | 0.539 | 5.815 |
| 0.422 | 0.525 | 5.815 |
| 0.414 | 0.512 | 5.815 |
| 0.406 | 0.498 | 5.815 |
| 0.398 | 0.485 | 5.815 |
| 0.390 | 0.471 | 5.815 |
| 0.381 | 0.458 | 5.815 |
| 0.373 | 0.445 | 5.815 |
| 0.365 | 0.431 | 5.815 |
| 0.356 | 0.418 | 5.815 |
| 0.348 | 0.405 | 5.815 |
| 0.339 | 0.392 | 5.815 |
| 0.330 | 0.379 | 5.815 |
| 0.321 | 0.366 | 5.815 |
| 0.312 | 0.353 | 5.815 |
| 0.303 | 0.340 | 5.815 |
| 0.294 | 0.328 | 5.815 |
| 0.285 | 0.315 | 5.815 |
| 0.275 | 0.303 | 5.815 |
| 0.266 | 0.290 | 5.815 |
| 0.256 | 0.278 | 5.815 |
| 0.246 | 0.265 | 5.815 |
| 0.236 | 0.253 | 5.815 |
| 0.227 | 0.241 | 5.815 |
| 0.216 | 0.229 | 5.815 |
| 0.206 | 0.217 | 5.815 |
| 0.196 | 0.205 | 5.815 |
| 0.186 | 0.194 | 5.815 |
| 0.175 | 0.182 | 5.815 |
| 0.164 | 0.170 | 5.815 |
| 0.154 | 0.159 | 5.815 |
| 0.143 | 0.147 | 5.815 |
| 0.132 | 0.136 | 5.815 |
| 0.121 | 0.125 | 5.815 |
| 0.110 | 0.114 | 5.815 |
| 0.099 | 0.103 | 5.815 |
| 0.087 | 0.092 | 5.815 |
| 0.076 | 0.081 | 5.815 |
| 0.065 | 0.070 | 5.815 |
| 0.053 | 0.060 | 5.815 |
| 0.041 | 0.049 | 5.815 |
| 0.030 | 0.039 | 5.815 |
| 0.018 | 0.028 | 5.815 |
| 0.006 | 0.018 | 5.815 |
| −0.006 | 0.008 | 5.815 |
| −0.018 | −0.002 | 5.815 |
| −0.030 | −0.012 | 5.815 |
| −0.043 | −0.022 | 5.815 |
| −0.055 | −0.031 | 5.815 |
| −0.068 | −0.041 | 5.815 |
| −0.080 | −0.050 | 5.815 |
| −0.093 | −0.059 | 5.815 |
| −0.106 | −0.068 | 5.815 |
| −0.119 | −0.077 | 5.815 |
| −0.132 | −0.086 | 5.815 |

TABLE 2-continued

| X | Y | Z |
|---|---|---|
| −0.145 | −0.095 | 5.815 |
| −0.158 | −0.103 | 5.815 |
| −0.171 | −0.112 | 5.815 |
| −0.184 | −0.120 | 5.815 |
| −0.198 | −0.128 | 5.815 |
| −0.211 | −0.136 | 5.815 |
| −0.225 | −0.144 | 5.815 |
| −0.239 | −0.152 | 5.815 |
| −0.252 | −0.159 | 5.815 |
| −0.266 | −0.167 | 5.815 |
| −0.280 | −0.175 | 5.815 |
| −0.294 | −0.182 | 5.815 |
| −0.307 | −0.189 | 5.815 |
| −0.321 | −0.197 | 5.815 |
| −0.335 | −0.204 | 5.815 |
| −0.349 | −0.212 | 5.815 |
| −0.363 | −0.219 | 5.815 |
| −0.377 | −0.227 | 5.815 |
| −0.390 | −0.234 | 5.815 |
| −0.404 | −0.242 | 5.815 |
| −0.417 | −0.250 | 5.815 |
| −0.431 | −0.258 | 5.815 |
| −0.433 | −0.260 | 5.815 |
| −0.436 | −0.262 | 5.815 |
| −0.439 | −0.263 | 5.815 |
| −0.441 | −0.265 | 5.815 |
| −0.444 | −0.267 | 5.815 |
| −0.447 | −0.269 | 5.815 |
| −0.449 | −0.270 | 5.815 |
| −0.452 | −0.272 | 5.815 |
| −0.454 | −0.274 | 5.815 |
| −0.457 | −0.276 | 5.815 |
| −0.461 | −0.279 | 5.815 |
| −0.466 | −0.283 | 5.815 |
| −0.469 | −0.286 | 5.815 |
| −0.473 | −0.291 | 5.815 |
| −0.476 | −0.295 | 5.815 |
| −0.479 | −0.300 | 5.815 |
| −0.482 | −0.305 | 5.815 |
| −0.483 | −0.310 | 5.815 |
| −0.484 | −0.315 | 5.815 |
| −0.484 | −0.321 | 5.815 |
| −0.482 | −0.326 | 5.815 |
| −0.479 | −0.331 | 5.815 |
| −0.475 | −0.335 | 5.815 |
| −0.470 | −0.338 | 5.815 |
| −0.465 | −0.339 | 5.815 |
| −0.460 | −0.341 | 5.815 |
| −0.454 | −0.341 | 5.815 |
| −0.449 | −0.341 | 5.815 |
| | SECTION 5 | |
| −0.470 | −0.359 | 5.945 |
| −0.467 | −0.358 | 5.945 |
| −0.463 | −0.358 | 5.945 |
| −0.460 | −0.357 | 5.945 |
| −0.457 | −0.356 | 5.945 |
| −0.453 | −0.356 | 5.945 |
| −0.450 | −0.355 | 5.945 |
| −0.447 | −0.355 | 5.945 |
| −0.443 | −0.354 | 5.945 |
| −0.440 | −0.353 | 5.945 |
| −0.437 | −0.353 | 5.945 |
| −0.420 | −0.349 | 5.945 |
| −0.403 | −0.345 | 5.945 |
| −0.387 | −0.340 | 5.945 |
| −0.370 | −0.335 | 5.945 |
| −0.354 | −0.330 | 5.945 |
| −0.338 | −0.324 | 5.945 |
| −0.322 | −0.318 | 5.945 |
| −0.306 | −0.312 | 5.945 |
| −0.290 | −0.305 | 5.945 |
| −0.274 | −0.298 | 5.945 |
| −0.259 | −0.291 | 5.945 |
| −0.244 | −0.283 | 5.945 |
| −0.229 | −0.275 | 5.945 |
| −0.214 | −0.266 | 5.945 |

TABLE 2-continued

| X | Y | Z |
|---|---|---|
| −0.199 | −0.257 | 5.945 |
| −0.184 | −0.248 | 5.945 |
| −0.170 | −0.239 | 5.945 |
| −0.156 | −0.229 | 5.945 |
| −0.142 | −0.220 | 5.945 |
| −0.128 | −0.209 | 5.945 |
| −0.114 | −0.199 | 5.945 |
| −0.101 | −0.188 | 5.945 |
| −0.087 | −0.178 | 5.945 |
| −0.074 | −0.167 | 5.945 |
| −0.061 | −0.155 | 5.945 |
| −0.048 | −0.144 | 5.945 |
| −0.036 | −0.132 | 5.945 |
| −0.023 | −0.121 | 5.945 |
| −0.011 | −0.109 | 5.945 |
| 0.001 | −0.097 | 5.945 |
| 0.013 | −0.084 | 5.945 |
| 0.025 | −0.072 | 5.945 |
| 0.037 | −0.059 | 5.945 |
| 0.048 | −0.047 | 5.945 |
| 0.059 | −0.034 | 5.945 |
| 0.071 | −0.021 | 5.945 |
| 0.082 | −0.008 | 5.945 |
| 0.093 | 0.006 | 5.945 |
| 0.103 | 0.019 | 5.945 |
| 0.114 | 0.032 | 5.945 |
| 0.125 | 0.046 | 5.945 |
| 0.135 | 0.059 | 5.945 |
| 0.145 | 0.073 | 5.945 |
| 0.156 | 0.087 | 5.945 |
| 0.166 | 0.101 | 5.945 |
| 0.176 | 0.115 | 5.945 |
| 0.186 | 0.128 | 5.945 |
| 0.196 | 0.142 | 5.945 |
| 0.206 | 0.156 | 5.945 |
| 0.216 | 0.170 | 5.945 |
| 0.226 | 0.185 | 5.945 |
| 0.235 | 0.199 | 5.945 |
| 0.245 | 0.213 | 5.945 |
| 0.255 | 0.227 | 5.945 |
| 0.264 | 0.241 | 5.945 |
| 0.274 | 0.255 | 5.945 |
| 0.283 | 0.270 | 5.945 |
| 0.293 | 0.284 | 5.945 |
| 0.302 | 0.298 | 5.945 |
| 0.311 | 0.313 | 5.945 |
| 0.321 | 0.327 | 5.945 |
| 0.330 | 0.342 | 5.945 |
| 0.339 | 0.356 | 5.945 |
| 0.348 | 0.371 | 5.945 |
| 0.357 | 0.385 | 5.945 |
| 0.366 | 0.400 | 5.945 |
| 0.375 | 0.415 | 5.945 |
| 0.384 | 0.429 | 5.945 |
| 0.393 | 0.444 | 5.945 |
| 0.401 | 0.459 | 5.945 |
| 0.410 | 0.474 | 5.945 |
| 0.418 | 0.489 | 5.945 |
| 0.427 | 0.504 | 5.945 |
| 0.435 | 0.519 | 5.945 |
| 0.443 | 0.534 | 5.945 |
| 0.451 | 0.549 | 5.945 |
| 0.459 | 0.564 | 5.945 |
| 0.467 | 0.579 | 5.945 |
| 0.475 | 0.594 | 5.945 |
| 0.477 | 0.598 | 5.945 |
| 0.478 | 0.601 | 5.945 |
| 0.480 | 0.604 | 5.945 |
| 0.481 | 0.607 | 5.945 |
| 0.483 | 0.610 | 5.945 |
| 0.484 | 0.613 | 5.945 |
| 0.486 | 0.616 | 5.945 |
| 0.487 | 0.619 | 5.945 |
| 0.489 | 0.622 | 5.945 |
| 0.490 | 0.625 | 5.945 |
| 0.491 | 0.627 | 5.945 |
| 0.491 | 0.629 | 5.945 |

TABLE 2-continued

| X | Y | Z |
|---|---|---|
| 0.492 | 0.631 | 5.945 |
| 0.491 | 0.633 | 5.945 |
| 0.491 | 0.635 | 5.945 |
| 0.490 | 0.637 | 5.945 |
| 0.490 | 0.638 | 5.945 |
| 0.488 | 0.640 | 5.945 |
| 0.487 | 0.641 | 5.945 |
| 0.485 | 0.643 | 5.945 |
| 0.484 | 0.644 | 5.945 |
| 0.482 | 0.644 | 5.945 |
| 0.480 | 0.644 | 5.945 |
| 0.478 | 0.644 | 5.945 |
| 0.476 | 0.644 | 5.945 |
| 0.474 | 0.643 | 5.945 |
| 0.473 | 0.642 | 5.945 |
| 0.471 | 0.640 | 5.945 |
| 0.470 | 0.639 | 5.945 |
| 0.469 | 0.636 | 5.945 |
| 0.467 | 0.633 | 5.945 |
| 0.465 | 0.630 | 5.945 |
| 0.464 | 0.627 | 5.945 |
| 0.462 | 0.625 | 5.945 |
| 0.461 | 0.622 | 5.945 |
| 0.459 | 0.619 | 5.945 |
| 0.457 | 0.616 | 5.945 |
| 0.456 | 0.613 | 5.945 |
| 0.454 | 0.610 | 5.945 |
| 0.446 | 0.596 | 5.945 |
| 0.438 | 0.582 | 5.945 |
| 0.430 | 0.568 | 5.945 |
| 0.422 | 0.554 | 5.945 |
| 0.414 | 0.539 | 5.945 |
| 0.405 | 0.525 | 5.945 |
| 0.397 | 0.511 | 5.945 |
| 0.389 | 0.497 | 5.945 |
| 0.380 | 0.483 | 5.945 |
| 0.372 | 0.469 | 5.945 |
| 0.363 | 0.456 | 5.945 |
| 0.354 | 0.442 | 5.945 |
| 0.345 | 0.428 | 5.945 |
| 0.337 | 0.415 | 5.945 |
| 0.327 | 0.401 | 5.945 |
| 0.318 | 0.387 | 5.945 |
| 0.309 | 0.374 | 5.945 |
| 0.300 | 0.361 | 5.945 |
| 0.290 | 0.347 | 5.945 |
| 0.281 | 0.334 | 5.945 |
| 0.271 | 0.321 | 5.945 |
| 0.261 | 0.308 | 5.945 |
| 0.251 | 0.295 | 5.945 |
| 0.241 | 0.282 | 5.945 |
| 0.231 | 0.269 | 5.945 |
| 0.221 | 0.257 | 5.945 |
| 0.210 | 0.244 | 5.945 |
| 0.200 | 0.231 | 5.945 |
| 0.189 | 0.219 | 5.945 |
| 0.179 | 0.207 | 5.945 |
| 0.168 | 0.194 | 5.945 |
| 0.157 | 0.182 | 5.945 |
| 0.146 | 0.170 | 5.945 |
| 0.135 | 0.158 | 5.945 |
| 0.124 | 0.146 | 5.945 |
| 0.113 | 0.134 | 5.945 |
| 0.101 | 0.123 | 5.945 |
| 0.090 | 0.111 | 5.945 |
| 0.078 | 0.100 | 5.945 |
| 0.067 | 0.088 | 5.945 |
| 0.055 | 0.077 | 5.945 |
| 0.043 | 0.065 | 5.945 |
| 0.031 | 0.054 | 5.945 |
| 0.019 | 0.043 | 5.945 |
| 0.007 | 0.032 | 5.945 |
| −0.005 | 0.022 | 5.945 |
| −0.018 | 0.011 | 5.945 |
| −0.030 | 0.000 | 5.945 |
| −0.043 | −0.010 | 5.945 |
| −0.055 | −0.020 | 5.945 |

TABLE 2-continued

| X | Y | Z |
|---|---|---|
| −0.068 | −0.030 | 5.945 |
| −0.081 | −0.040 | 5.945 |
| −0.094 | −0.050 | 5.945 |
| −0.107 | −0.060 | 5.945 |
| −0.121 | −0.069 | 5.945 |
| −0.134 | −0.079 | 5.945 |
| −0.147 | −0.088 | 5.945 |
| −0.161 | −0.097 | 5.945 |
| −0.175 | −0.106 | 5.945 |
| −0.188 | −0.115 | 5.945 |
| −0.202 | −0.124 | 5.945 |
| −0.216 | −0.132 | 5.945 |
| −0.230 | −0.141 | 5.945 |
| −0.244 | −0.149 | 5.945 |
| −0.258 | −0.157 | 5.945 |
| −0.272 | −0.165 | 5.945 |
| −0.287 | −0.173 | 5.945 |
| −0.301 | −0.181 | 5.945 |
| −0.315 | −0.189 | 5.945 |
| −0.330 | −0.197 | 5.945 |
| −0.344 | −0.205 | 5.945 |
| −0.358 | −0.212 | 5.945 |
| −0.372 | −0.220 | 5.945 |
| −0.387 | −0.228 | 5.945 |
| −0.401 | −0.236 | 5.945 |
| −0.415 | −0.244 | 5.945 |
| −0.429 | −0.253 | 5.945 |
| −0.443 | −0.261 | 5.945 |
| −0.457 | −0.270 | 5.945 |
| −0.460 | −0.272 | 5.945 |
| −0.462 | −0.273 | 5.945 |
| −0.465 | −0.275 | 5.945 |
| −0.468 | −0.277 | 5.945 |
| −0.471 | −0.279 | 5.945 |
| −0.473 | −0.281 | 5.945 |
| −0.476 | −0.282 | 5.945 |
| −0.479 | −0.284 | 5.945 |
| −0.481 | −0.286 | 5.945 |
| −0.484 | −0.288 | 5.945 |
| −0.489 | −0.292 | 5.945 |
| −0.493 | −0.296 | 5.945 |
| −0.498 | −0.300 | 5.945 |
| −0.502 | −0.304 | 5.945 |
| −0.505 | −0.309 | 5.945 |
| −0.509 | −0.314 | 5.945 |
| −0.511 | −0.320 | 5.945 |
| −0.513 | −0.325 | 5.945 |
| −0.514 | −0.331 | 5.945 |
| −0.514 | −0.337 | 5.945 |
| −0.512 | −0.343 | 5.945 |
| −0.509 | −0.348 | 5.945 |
| −0.505 | −0.353 | 5.945 |
| −0.500 | −0.356 | 5.945 |
| −0.494 | −0.358 | 5.945 |
| −0.488 | −0.359 | 5.945 |
| −0.482 | −0.360 | 5.945 |
| −0.476 | −0.359 | 5.945 |
| | SECTION 6 | |
| −0.503 | −0.380 | 6.075 |
| −0.499 | −0.379 | 6.075 |
| −0.496 | −0.379 | 6.075 |
| −0.492 | −0.378 | 6.075 |
| −0.489 | −0.377 | 6.075 |
| −0.485 | −0.377 | 6.075 |
| −0.482 | −0.376 | 6.075 |
| −0.478 | −0.375 | 6.075 |
| −0.475 | −0.375 | 6.075 |
| −0.471 | −0.374 | 6.075 |
| −0.468 | −0.373 | 6.075 |
| −0.450 | −0.370 | 6.075 |
| −0.433 | −0.365 | 6.075 |
| −0.415 | −0.361 | 6.075 |
| −0.398 | −0.356 | 6.075 |
| −0.381 | −0.350 | 6.075 |
| −0.364 | −0.344 | 6.075 |
| −0.347 | −0.338 | 6.075 |

TABLE 2-continued

| X | Y | Z |
|---|---|---|
| −0.331 | −0.331 | 6.075 |
| −0.314 | −0.324 | 6.075 |
| −0.298 | −0.317 | 6.075 |
| −0.282 | −0.309 | 6.075 |
| −0.266 | −0.301 | 6.075 |
| −0.250 | −0.292 | 6.075 |
| −0.234 | −0.284 | 6.075 |
| −0.219 | −0.274 | 6.075 |
| −0.203 | −0.265 | 6.075 |
| −0.188 | −0.255 | 6.075 |
| −0.174 | −0.245 | 6.075 |
| −0.159 | −0.235 | 6.075 |
| −0.145 | −0.224 | 6.075 |
| −0.130 | −0.213 | 6.075 |
| −0.116 | −0.202 | 6.075 |
| −0.102 | −0.190 | 6.075 |
| −0.089 | −0.179 | 6.075 |
| −0.075 | −0.167 | 6.075 |
| −0.062 | −0.155 | 6.075 |
| −0.049 | −0.142 | 6.075 |
| −0.036 | −0.130 | 6.075 |
| −0.023 | −0.117 | 6.075 |
| −0.011 | −0.104 | 6.075 |
| 0.002 | −0.091 | 6.075 |
| 0.014 | −0.078 | 6.075 |
| 0.026 | −0.065 | 6.075 |
| 0.038 | −0.051 | 6.075 |
| 0.049 | −0.038 | 6.075 |
| 0.061 | −0.024 | 6.075 |
| 0.072 | −0.010 | 6.075 |
| 0.084 | 0.004 | 6.075 |
| 0.095 | 0.018 | 6.075 |
| 0.106 | 0.032 | 6.075 |
| 0.117 | 0.046 | 6.075 |
| 0.127 | 0.061 | 6.075 |
| 0.138 | 0.075 | 6.075 |
| 0.149 | 0.090 | 6.075 |
| 0.159 | 0.104 | 6.075 |
| 0.170 | 0.119 | 6.075 |
| 0.180 | 0.133 | 6.075 |
| 0.190 | 0.148 | 6.075 |
| 0.200 | 0.163 | 6.075 |
| 0.211 | 0.178 | 6.075 |
| 0.221 | 0.193 | 6.075 |
| 0.231 | 0.207 | 6.075 |
| 0.241 | 0.222 | 6.075 |
| 0.251 | 0.237 | 6.075 |
| 0.260 | 0.252 | 6.075 |
| 0.270 | 0.267 | 6.075 |
| 0.280 | 0.282 | 6.075 |
| 0.290 | 0.298 | 6.075 |
| 0.299 | 0.313 | 6.075 |
| 0.309 | 0.328 | 6.075 |
| 0.318 | 0.343 | 6.075 |
| 0.328 | 0.358 | 6.075 |
| 0.337 | 0.374 | 6.075 |
| 0.346 | 0.389 | 6.075 |
| 0.356 | 0.405 | 6.075 |
| 0.365 | 0.420 | 6.075 |
| 0.374 | 0.436 | 6.075 |
| 0.383 | 0.451 | 6.075 |
| 0.392 | 0.467 | 6.075 |
| 0.401 | 0.482 | 6.075 |
| 0.409 | 0.498 | 6.075 |
| 0.418 | 0.514 | 6.075 |
| 0.426 | 0.529 | 6.075 |
| 0.435 | 0.545 | 6.075 |
| 0.443 | 0.561 | 6.075 |
| 0.451 | 0.577 | 6.075 |
| 0.459 | 0.593 | 6.075 |
| 0.467 | 0.609 | 6.075 |
| 0.475 | 0.625 | 6.075 |
| 0.477 | 0.629 | 6.075 |
| 0.478 | 0.632 | 6.075 |
| 0.480 | 0.635 | 6.075 |
| 0.481 | 0.638 | 6.075 |
| 0.483 | 0.642 | 6.075 |

TABLE 2-continued

| X | Y | Z |
|---|---|---|
| 0.485 | 0.645 | 6.075 |
| 0.486 | 0.648 | 6.075 |
| 0.488 | 0.651 | 6.075 |
| 0.489 | 0.655 | 6.075 |
| 0.491 | 0.658 | 6.075 |
| 0.491 | 0.660 | 6.075 |
| 0.492 | 0.662 | 6.075 |
| 0.492 | 0.664 | 6.075 |
| 0.492 | 0.666 | 6.075 |
| 0.491 | 0.668 | 6.075 |
| 0.491 | 0.669 | 6.075 |
| 0.490 | 0.671 | 6.075 |
| 0.488 | 0.673 | 6.075 |
| 0.487 | 0.674 | 6.075 |
| 0.486 | 0.675 | 6.075 |
| 0.484 | 0.676 | 6.075 |
| 0.482 | 0.677 | 6.075 |
| 0.480 | 0.677 | 6.075 |
| 0.478 | 0.677 | 6.075 |
| 0.476 | 0.676 | 6.075 |
| 0.474 | 0.676 | 6.075 |
| 0.473 | 0.674 | 6.075 |
| 0.472 | 0.673 | 6.075 |
| 0.470 | 0.671 | 6.075 |
| 0.469 | 0.668 | 6.075 |
| 0.467 | 0.665 | 6.075 |
| 0.466 | 0.662 | 6.075 |
| 0.464 | 0.659 | 6.075 |
| 0.462 | 0.656 | 6.075 |
| 0.461 | 0.653 | 6.075 |
| 0.459 | 0.650 | 6.075 |
| 0.458 | 0.647 | 6.075 |
| 0.456 | 0.644 | 6.075 |
| 0.454 | 0.641 | 6.075 |
| 0.446 | 0.626 | 6.075 |
| 0.438 | 0.611 | 6.075 |
| 0.430 | 0.596 | 6.075 |
| 0.422 | 0.581 | 6.075 |
| 0.413 | 0.566 | 6.075 |
| 0.405 | 0.552 | 6.075 |
| 0.396 | 0.537 | 6.075 |
| 0.388 | 0.522 | 6.075 |
| 0.379 | 0.508 | 6.075 |
| 0.370 | 0.493 | 6.075 |
| 0.361 | 0.479 | 6.075 |
| 0.352 | 0.464 | 6.075 |
| 0.343 | 0.450 | 6.075 |
| 0.334 | 0.435 | 6.075 |
| 0.325 | 0.421 | 6.075 |
| 0.315 | 0.407 | 6.075 |
| 0.305 | 0.393 | 6.075 |
| 0.296 | 0.379 | 6.075 |
| 0.286 | 0.365 | 6.075 |
| 0.276 | 0.351 | 6.075 |
| 0.266 | 0.337 | 6.075 |
| 0.256 | 0.324 | 6.075 |
| 0.246 | 0.310 | 6.075 |
| 0.235 | 0.296 | 6.075 |
| 0.225 | 0.283 | 6.075 |
| 0.214 | 0.270 | 6.075 |
| 0.204 | 0.256 | 6.075 |
| 0.193 | 0.243 | 6.075 |
| 0.182 | 0.230 | 6.075 |
| 0.171 | 0.217 | 6.075 |
| 0.160 | 0.204 | 6.075 |
| 0.149 | 0.191 | 6.075 |
| 0.138 | 0.178 | 6.075 |
| 0.126 | 0.166 | 6.075 |
| 0.115 | 0.153 | 6.075 |
| 0.103 | 0.141 | 6.075 |
| 0.091 | 0.128 | 6.075 |
| 0.080 | 0.116 | 6.075 |
| 0.068 | 0.104 | 6.075 |
| 0.056 | 0.092 | 6.075 |
| 0.043 | 0.080 | 6.075 |
| 0.031 | 0.068 | 6.075 |
| 0.019 | 0.056 | 6.075 |

TABLE 2-continued

| X | Y | Z |
|---|---|---|
| 0.006 | 0.045 | 6.075 |
| −0.006 | 0.033 | 6.075 |
| −0.019 | 0.022 | 6.075 |
| −0.032 | 0.011 | 6.075 |
| −0.045 | 0.000 | 6.075 |
| −0.058 | −0.011 | 6.075 |
| −0.071 | −0.022 | 6.075 |
| −0.084 | −0.032 | 6.075 |
| −0.098 | −0.043 | 6.075 |
| −0.111 | −0.053 | 6.075 |
| −0.125 | −0.063 | 6.075 |
| −0.139 | −0.073 | 6.075 |
| −0.153 | −0.083 | 6.075 |
| −0.167 | −0.093 | 6.075 |
| −0.181 | −0.102 | 6.075 |
| −0.195 | −0.112 | 6.075 |
| −0.209 | −0.121 | 6.075 |
| −0.224 | −0.130 | 6.075 |
| −0.238 | −0.139 | 6.075 |
| −0.253 | −0.148 | 6.075 |
| −0.268 | −0.156 | 6.075 |
| −0.282 | −0.165 | 6.075 |
| −0.297 | −0.173 | 6.075 |
| −0.312 | −0.182 | 6.075 |
| −0.327 | −0.190 | 6.075 |
| −0.342 | −0.199 | 6.075 |
| −0.356 | −0.207 | 6.075 |
| −0.371 | −0.215 | 6.075 |
| −0.386 | −0.224 | 6.075 |
| −0.401 | −0.232 | 6.075 |
| −0.416 | −0.240 | 6.075 |
| −0.431 | −0.249 | 6.075 |
| −0.445 | −0.257 | 6.075 |
| −0.460 | −0.266 | 6.075 |
| −0.474 | −0.275 | 6.075 |
| −0.489 | −0.284 | 6.075 |
| −0.491 | −0.286 | 6.075 |
| −0.494 | −0.288 | 6.075 |
| −0.497 | −0.290 | 6.075 |
| −0.500 | −0.292 | 6.075 |
| −0.503 | −0.294 | 6.075 |
| −0.506 | −0.296 | 6.075 |
| −0.508 | −0.298 | 6.075 |
| −0.511 | −0.300 | 6.075 |
| −0.514 | −0.302 | 6.075 |
| −0.517 | −0.304 | 6.075 |
| −0.522 | −0.308 | 6.075 |
| −0.527 | −0.312 | 6.075 |
| −0.532 | −0.316 | 6.075 |
| −0.536 | −0.321 | 6.075 |
| −0.540 | −0.326 | 6.075 |
| −0.544 | −0.332 | 6.075 |
| −0.546 | −0.338 | 6.075 |
| −0.549 | −0.344 | 6.075 |
| −0.550 | −0.350 | 6.075 |
| −0.550 | −0.357 | 6.075 |
| −0.548 | −0.363 | 6.075 |
| −0.545 | −0.369 | 6.075 |
| −0.541 | −0.373 | 6.075 |
| −0.535 | −0.377 | 6.075 |
| −0.529 | −0.379 | 6.075 |
| −0.523 | −0.381 | 6.075 |
| −0.516 | −0.381 | 6.075 |
| −0.509 | −0.381 | 6.075 |
| | SECTION 7 | |
| −0.543 | −0.405 | 6.205 |
| −0.539 | −0.404 | 6.205 |
| −0.536 | −0.403 | 6.205 |
| −0.532 | −0.403 | 6.205 |
| −0.528 | −0.402 | 6.205 |
| −0.525 | −0.401 | 6.205 |
| −0.521 | −0.401 | 6.205 |
| −0.517 | −0.400 | 6.205 |
| −0.513 | −0.399 | 6.205 |
| −0.510 | −0.399 | 6.205 |
| −0.506 | −0.398 | 6.205 |

TABLE 2-continued

| X | Y | Z |
|---|---|---|
| −0.488 | −0.394 | 6.205 |
| −0.469 | −0.389 | 6.205 |
| −0.451 | −0.385 | 6.205 |
| −0.433 | −0.379 | 6.205 |
| −0.415 | −0.374 | 6.205 |
| −0.397 | −0.368 | 6.205 |
| −0.379 | −0.361 | 6.205 |
| −0.362 | −0.355 | 6.205 |
| −0.344 | −0.347 | 6.205 |
| −0.327 | −0.340 | 6.205 |
| −0.310 | −0.332 | 6.205 |
| −0.293 | −0.323 | 6.205 |
| −0.276 | −0.315 | 6.205 |
| −0.260 | −0.306 | 6.205 |
| −0.243 | −0.296 | 6.205 |
| −0.227 | −0.286 | 6.205 |
| −0.211 | −0.276 | 6.205 |
| −0.196 | −0.266 | 6.205 |
| −0.180 | −0.255 | 6.205 |
| −0.165 | −0.244 | 6.205 |
| −0.150 | −0.232 | 6.205 |
| −0.135 | −0.220 | 6.205 |
| −0.121 | −0.208 | 6.205 |
| −0.106 | −0.196 | 6.205 |
| −0.092 | −0.184 | 6.205 |
| −0.078 | −0.171 | 6.205 |
| −0.064 | −0.158 | 6.205 |
| −0.051 | −0.145 | 6.205 |
| −0.038 | −0.131 | 6.205 |
| −0.024 | −0.118 | 6.205 |
| −0.012 | −0.104 | 6.205 |
| 0.001 | −0.090 | 6.205 |
| 0.014 | −0.076 | 6.205 |
| 0.026 | −0.062 | 6.205 |
| 0.038 | −0.047 | 6.205 |
| 0.050 | −0.033 | 6.205 |
| 0.062 | −0.018 | 6.205 |
| 0.074 | −0.003 | 6.205 |
| 0.085 | 0.011 | 6.205 |
| 0.097 | 0.026 | 6.205 |
| 0.108 | 0.042 | 6.205 |
| 0.119 | 0.057 | 6.205 |
| 0.130 | 0.072 | 6.205 |
| 0.141 | 0.087 | 6.205 |
| 0.152 | 0.103 | 6.205 |
| 0.163 | 0.118 | 6.205 |
| 0.174 | 0.134 | 6.205 |
| 0.184 | 0.150 | 6.205 |
| 0.195 | 0.165 | 6.205 |
| 0.205 | 0.181 | 6.205 |
| 0.216 | 0.197 | 6.205 |
| 0.226 | 0.213 | 6.205 |
| 0.236 | 0.228 | 6.205 |
| 0.246 | 0.244 | 6.205 |
| 0.257 | 0.260 | 6.205 |
| 0.267 | 0.276 | 6.205 |
| 0.277 | 0.292 | 6.205 |
| 0.287 | 0.308 | 6.205 |
| 0.296 | 0.324 | 6.205 |
| 0.306 | 0.340 | 6.205 |
| 0.316 | 0.357 | 6.205 |
| 0.326 | 0.373 | 6.205 |
| 0.335 | 0.389 | 6.205 |
| 0.345 | 0.405 | 6.205 |
| 0.354 | 0.422 | 6.205 |
| 0.363 | 0.438 | 6.205 |
| 0.373 | 0.455 | 6.205 |
| 0.382 | 0.471 | 6.205 |
| 0.391 | 0.488 | 6.205 |
| 0.400 | 0.504 | 6.205 |
| 0.409 | 0.521 | 6.205 |
| 0.417 | 0.538 | 6.205 |
| 0.426 | 0.554 | 6.205 |
| 0.435 | 0.571 | 6.205 |
| 0.443 | 0.588 | 6.205 |
| 0.451 | 0.605 | 6.205 |
| 0.460 | 0.622 | 6.205 |

TABLE 2-continued

| X | Y | Z |
|---|---|---|
| 0.468 | 0.639 | 6.205 |
| 0.475 | 0.656 | 6.205 |
| 0.477 | 0.660 | 6.205 |
| 0.479 | 0.663 | 6.205 |
| 0.480 | 0.667 | 6.205 |
| 0.482 | 0.670 | 6.205 |
| 0.483 | 0.673 | 6.205 |
| 0.485 | 0.677 | 6.205 |
| 0.486 | 0.680 | 6.205 |
| 0.488 | 0.684 | 6.205 |
| 0.489 | 0.687 | 6.205 |
| 0.491 | 0.691 | 6.205 |
| 0.491 | 0.693 | 6.205 |
| 0.492 | 0.694 | 6.205 |
| 0.492 | 0.696 | 6.205 |
| 0.492 | 0.698 | 6.205 |
| 0.491 | 0.700 | 6.205 |
| 0.491 | 0.702 | 6.205 |
| 0.490 | 0.704 | 6.205 |
| 0.489 | 0.705 | 6.205 |
| 0.487 | 0.707 | 6.205 |
| 0.486 | 0.708 | 6.205 |
| 0.484 | 0.709 | 6.205 |
| 0.482 | 0.709 | 6.205 |
| 0.480 | 0.710 | 6.205 |
| 0.478 | 0.709 | 6.205 |
| 0.476 | 0.709 | 6.205 |
| 0.475 | 0.708 | 6.205 |
| 0.473 | 0.707 | 6.205 |
| 0.472 | 0.705 | 6.205 |
| 0.471 | 0.704 | 6.205 |
| 0.469 | 0.700 | 6.205 |
| 0.468 | 0.697 | 6.205 |
| 0.466 | 0.694 | 6.205 |
| 0.464 | 0.691 | 6.205 |
| 0.463 | 0.688 | 6.205 |
| 0.461 | 0.684 | 6.205 |
| 0.460 | 0.681 | 6.205 |
| 0.458 | 0.678 | 6.205 |
| 0.456 | 0.675 | 6.205 |
| 0.455 | 0.672 | 6.205 |
| 0.447 | 0.656 | 6.205 |
| 0.438 | 0.640 | 6.205 |
| 0.430 | 0.624 | 6.205 |
| 0.422 | 0.608 | 6.205 |
| 0.413 | 0.593 | 6.205 |
| 0.404 | 0.577 | 6.205 |
| 0.396 | 0.562 | 6.205 |
| 0.387 | 0.546 | 6.205 |
| 0.378 | 0.531 | 6.205 |
| 0.369 | 0.515 | 6.205 |
| 0.360 | 0.500 | 6.205 |
| 0.350 | 0.485 | 6.205 |
| 0.341 | 0.470 | 6.205 |
| 0.331 | 0.454 | 6.205 |
| 0.322 | 0.439 | 6.205 |
| 0.312 | 0.424 | 6.205 |
| 0.302 | 0.410 | 6.205 |
| 0.292 | 0.395 | 6.205 |
| 0.282 | 0.380 | 6.205 |
| 0.272 | 0.366 | 6.205 |
| 0.261 | 0.351 | 6.205 |
| 0.251 | 0.337 | 6.205 |
| 0.240 | 0.322 | 6.205 |
| 0.230 | 0.308 | 6.205 |
| 0.219 | 0.294 | 6.205 |
| 0.208 | 0.280 | 6.205 |
| 0.197 | 0.266 | 6.205 |
| 0.186 | 0.252 | 6.205 |
| 0.175 | 0.238 | 6.205 |
| 0.163 | 0.224 | 6.205 |
| 0.152 | 0.210 | 6.205 |
| 0.140 | 0.197 | 6.205 |
| 0.128 | 0.183 | 6.205 |
| 0.116 | 0.170 | 6.205 |
| 0.104 | 0.157 | 6.205 |
| 0.092 | 0.144 | 6.205 |

TABLE 2-continued

| X | Y | Z |
|---|---|---|
| 0.080 | 0.131 | 6.205 |
| 0.068 | 0.118 | 6.205 |
| 0.055 | 0.105 | 6.205 |
| 0.043 | 0.092 | 6.205 |
| 0.030 | 0.080 | 6.205 |
| 0.017 | 0.067 | 6.205 |
| 0.004 | 0.055 | 6.205 |
| −0.009 | 0.043 | 6.205 |
| −0.022 | 0.031 | 6.205 |
| −0.035 | 0.019 | 6.205 |
| −0.049 | 0.007 | 6.205 |
| −0.062 | −0.004 | 6.205 |
| −0.076 | −0.016 | 6.205 |
| −0.090 | −0.027 | 6.205 |
| −0.104 | −0.038 | 6.205 |
| −0.118 | −0.049 | 6.205 |
| −0.132 | −0.060 | 6.205 |
| −0.147 | −0.070 | 6.205 |
| −0.161 | −0.081 | 6.205 |
| −0.176 | −0.091 | 6.205 |
| −0.191 | −0.101 | 6.205 |
| −0.205 | −0.111 | 6.205 |
| −0.220 | −0.121 | 6.205 |
| −0.235 | −0.130 | 6.205 |
| −0.251 | −0.140 | 6.205 |
| −0.266 | −0.149 | 6.205 |
| −0.281 | −0.158 | 6.205 |
| −0.296 | −0.167 | 6.205 |
| −0.312 | −0.176 | 6.205 |
| −0.327 | −0.185 | 6.205 |
| −0.343 | −0.194 | 6.205 |
| −0.358 | −0.203 | 6.205 |
| −0.374 | −0.212 | 6.205 |
| −0.389 | −0.221 | 6.205 |
| −0.405 | −0.229 | 6.205 |
| −0.420 | −0.238 | 6.205 |
| −0.436 | −0.247 | 6.205 |
| −0.451 | −0.256 | 6.205 |
| −0.467 | −0.265 | 6.205 |
| −0.482 | −0.274 | 6.205 |
| −0.497 | −0.284 | 6.205 |
| −0.512 | −0.293 | 6.205 |
| −0.527 | −0.303 | 6.205 |
| −0.530 | −0.305 | 6.205 |
| −0.533 | −0.307 | 6.205 |
| −0.536 | −0.309 | 6.205 |
| −0.539 | −0.311 | 6.205 |
| −0.542 | −0.313 | 6.205 |
| −0.545 | −0.315 | 6.205 |
| −0.548 | −0.317 | 6.205 |
| −0.551 | −0.319 | 6.205 |
| −0.554 | −0.321 | 6.205 |
| −0.557 | −0.323 | 6.205 |
| −0.562 | −0.327 | 6.205 |
| −0.567 | −0.332 | 6.205 |
| −0.572 | −0.337 | 6.205 |
| −0.577 | −0.342 | 6.205 |
| −0.581 | −0.347 | 6.205 |
| −0.585 | −0.353 | 6.205 |
| −0.588 | −0.359 | 6.205 |
| −0.591 | −0.366 | 6.205 |
| −0.592 | −0.373 | 6.205 |
| −0.592 | −0.380 | 6.205 |
| −0.591 | −0.386 | 6.205 |
| −0.588 | −0.392 | 6.205 |
| −0.583 | −0.397 | 6.205 |
| −0.577 | −0.401 | 6.205 |
| −0.571 | −0.404 | 6.205 |
| −0.564 | −0.405 | 6.205 |
| −0.557 | −0.406 | 6.205 |
| −0.550 | −0.405 | 6.205 |
| | SECTION 8 | |
| −0.616 | −0.448 | 6.405 |
| −0.612 | −0.447 | 6.405 |
| −0.608 | −0.446 | 6.405 |
| −0.604 | −0.446 | 6.405 |

TABLE 2-continued

| X | Y | Z |
|---|---|---|
| −0.599 | −0.445 | 6.405 |
| −0.595 | −0.444 | 6.405 |
| −0.591 | −0.444 | 6.405 |
| −0.587 | −0.443 | 6.405 |
| −0.583 | −0.442 | 6.405 |
| −0.579 | −0.441 | 6.405 |
| −0.575 | −0.441 | 6.405 |
| −0.555 | −0.436 | 6.405 |
| −0.535 | −0.432 | 6.405 |
| −0.516 | −0.427 | 6.405 |
| −0.496 | −0.421 | 6.405 |
| −0.476 | −0.416 | 6.405 |
| −0.457 | −0.410 | 6.405 |
| −0.437 | −0.403 | 6.405 |
| −0.418 | −0.396 | 6.405 |
| −0.399 | −0.389 | 6.405 |
| −0.380 | −0.381 | 6.405 |
| −0.361 | −0.373 | 6.405 |
| −0.343 | −0.364 | 6.405 |
| −0.324 | −0.355 | 6.405 |
| −0.306 | −0.346 | 6.405 |
| −0.288 | −0.336 | 6.405 |
| −0.270 | −0.326 | 6.405 |
| −0.253 | −0.315 | 6.405 |
| −0.236 | −0.304 | 6.405 |
| −0.218 | −0.293 | 6.405 |
| −0.202 | −0.281 | 6.405 |
| −0.185 | −0.269 | 6.405 |
| −0.169 | −0.257 | 6.405 |
| −0.153 | −0.244 | 6.405 |
| −0.137 | −0.231 | 6.405 |
| −0.121 | −0.218 | 6.405 |
| −0.106 | −0.204 | 6.405 |
| −0.091 | −0.190 | 6.405 |
| −0.076 | −0.176 | 6.405 |
| −0.062 | −0.162 | 6.405 |
| −0.047 | −0.147 | 6.405 |
| −0.033 | −0.132 | 6.405 |
| −0.020 | −0.117 | 6.405 |
| −0.006 | −0.102 | 6.405 |
| 0.007 | −0.087 | 6.405 |
| 0.021 | −0.071 | 6.405 |
| 0.033 | −0.055 | 6.405 |
| 0.046 | −0.039 | 6.405 |
| 0.059 | −0.023 | 6.405 |
| 0.071 | −0.007 | 6.405 |
| 0.083 | 0.010 | 6.405 |
| 0.095 | 0.026 | 6.405 |
| 0.107 | 0.043 | 6.405 |
| 0.119 | 0.060 | 6.405 |
| 0.130 | 0.077 | 6.405 |
| 0.142 | 0.094 | 6.405 |
| 0.153 | 0.111 | 6.405 |
| 0.164 | 0.128 | 6.405 |
| 0.176 | 0.145 | 6.405 |
| 0.187 | 0.162 | 6.405 |
| 0.198 | 0.180 | 6.405 |
| 0.208 | 0.197 | 6.405 |
| 0.219 | 0.214 | 6.405 |
| 0.230 | 0.232 | 6.405 |
| 0.240 | 0.249 | 6.405 |
| 0.251 | 0.267 | 6.405 |
| 0.261 | 0.284 | 6.405 |
| 0.272 | 0.302 | 6.405 |
| 0.282 | 0.320 | 6.405 |
| 0.292 | 0.337 | 6.405 |
| 0.303 | 0.355 | 6.405 |
| 0.313 | 0.373 | 6.405 |
| 0.323 | 0.391 | 6.405 |
| 0.333 | 0.409 | 6.405 |
| 0.342 | 0.427 | 6.405 |
| 0.352 | 0.445 | 6.405 |
| 0.362 | 0.463 | 6.405 |
| 0.371 | 0.481 | 6.405 |
| 0.381 | 0.499 | 6.405 |
| 0.390 | 0.517 | 6.405 |
| 0.399 | 0.536 | 6.405 |

TABLE 2-continued

| X | Y | Z |
|---|---|---|
| 0.408 | 0.554 | 6.405 |
| 0.417 | 0.572 | 6.405 |
| 0.426 | 0.591 | 6.405 |
| 0.435 | 0.609 | 6.405 |
| 0.443 | 0.628 | 6.405 |
| 0.452 | 0.647 | 6.405 |
| 0.460 | 0.665 | 6.405 |
| 0.468 | 0.684 | 6.405 |
| 0.476 | 0.703 | 6.405 |
| 0.477 | 0.707 | 6.405 |
| 0.479 | 0.711 | 6.405 |
| 0.481 | 0.714 | 6.405 |
| 0.482 | 0.718 | 6.405 |
| 0.484 | 0.722 | 6.405 |
| 0.485 | 0.726 | 6.405 |
| 0.487 | 0.730 | 6.405 |
| 0.488 | 0.733 | 6.405 |
| 0.490 | 0.737 | 6.405 |
| 0.491 | 0.741 | 6.405 |
| 0.492 | 0.743 | 6.405 |
| 0.492 | 0.745 | 6.405 |
| 0.492 | 0.747 | 6.405 |
| 0.492 | 0.749 | 6.405 |
| 0.492 | 0.750 | 6.405 |
| 0.491 | 0.752 | 6.405 |
| 0.490 | 0.754 | 6.405 |
| 0.489 | 0.756 | 6.405 |
| 0.487 | 0.757 | 6.405 |
| 0.486 | 0.758 | 6.405 |
| 0.484 | 0.759 | 6.405 |
| 0.482 | 0.759 | 6.405 |
| 0.480 | 0.760 | 6.405 |
| 0.478 | 0.759 | 6.405 |
| 0.476 | 0.759 | 6.405 |
| 0.475 | 0.758 | 6.405 |
| 0.473 | 0.756 | 6.405 |
| 0.472 | 0.755 | 6.405 |
| 0.471 | 0.753 | 6.405 |
| 0.470 | 0.750 | 6.405 |
| 0.468 | 0.746 | 6.405 |
| 0.466 | 0.743 | 6.405 |
| 0.465 | 0.739 | 6.405 |
| 0.463 | 0.736 | 6.405 |
| 0.462 | 0.732 | 6.405 |
| 0.460 | 0.729 | 6.405 |
| 0.458 | 0.725 | 6.405 |
| 0.457 | 0.722 | 6.405 |
| 0.455 | 0.718 | 6.405 |
| 0.447 | 0.701 | 6.405 |
| 0.439 | 0.683 | 6.405 |
| 0.430 | 0.666 | 6.405 |
| 0.422 | 0.649 | 6.405 |
| 0.413 | 0.632 | 6.405 |
| 0.404 | 0.615 | 6.405 |
| 0.395 | 0.598 | 6.405 |
| 0.386 | 0.581 | 6.405 |
| 0.377 | 0.564 | 6.405 |
| 0.367 | 0.547 | 6.405 |
| 0.358 | 0.530 | 6.405 |
| 0.348 | 0.514 | 6.405 |
| 0.338 | 0.497 | 6.405 |
| 0.328 | 0.481 | 6.405 |
| 0.318 | 0.464 | 6.405 |
| 0.308 | 0.448 | 6.405 |
| 0.298 | 0.432 | 6.405 |
| 0.287 | 0.416 | 6.405 |
| 0.276 | 0.399 | 6.405 |
| 0.266 | 0.384 | 6.405 |
| 0.255 | 0.368 | 6.405 |
| 0.244 | 0.352 | 6.405 |
| 0.232 | 0.336 | 6.405 |
| 0.221 | 0.321 | 6.405 |
| 0.210 | 0.305 | 6.405 |
| 0.198 | 0.290 | 6.405 |
| 0.186 | 0.275 | 6.405 |
| 0.174 | 0.259 | 6.405 |
| 0.162 | 0.244 | 6.405 |

TABLE 2-continued

| X | Y | Z |
|---|---|---|
| 0.150 | 0.230 | 6.405 |
| 0.138 | 0.215 | 6.405 |
| 0.125 | 0.200 | 6.405 |
| 0.113 | 0.185 | 6.405 |
| 0.100 | 0.171 | 6.405 |
| 0.087 | 0.157 | 6.405 |
| 0.074 | 0.143 | 6.405 |
| 0.061 | 0.129 | 6.405 |
| 0.048 | 0.115 | 6.405 |
| 0.034 | 0.101 | 6.405 |
| 0.021 | 0.087 | 6.405 |
| 0.007 | 0.074 | 6.405 |
| −0.007 | 0.061 | 6.405 |
| −0.021 | 0.047 | 6.405 |
| −0.035 | 0.034 | 6.405 |
| −0.050 | 0.022 | 6.405 |
| −0.064 | 0.009 | 6.405 |
| −0.079 | −0.003 | 6.405 |
| −0.094 | −0.016 | 6.405 |
| −0.109 | −0.028 | 6.405 |
| −0.124 | −0.040 | 6.405 |
| −0.139 | −0.051 | 6.405 |
| −0.155 | −0.063 | 6.405 |
| −0.170 | −0.074 | 6.405 |
| −0.186 | −0.085 | 6.405 |
| −0.202 | −0.096 | 6.405 |
| −0.218 | −0.107 | 6.405 |
| −0.234 | −0.118 | 6.405 |
| −0.250 | −0.129 | 6.405 |
| −0.266 | −0.139 | 6.405 |
| −0.282 | −0.149 | 6.405 |
| −0.298 | −0.159 | 6.405 |
| −0.315 | −0.169 | 6.405 |
| −0.331 | −0.179 | 6.405 |
| −0.348 | −0.189 | 6.405 |
| −0.365 | −0.199 | 6.405 |
| −0.381 | −0.208 | 6.405 |
| −0.398 | −0.218 | 6.405 |
| −0.415 | −0.228 | 6.405 |
| −0.431 | −0.237 | 6.405 |
| −0.448 | −0.247 | 6.405 |
| −0.465 | −0.257 | 6.405 |
| −0.481 | −0.266 | 6.405 |
| −0.498 | −0.276 | 6.405 |
| −0.514 | −0.286 | 6.405 |
| −0.531 | −0.296 | 6.405 |
| −0.547 | −0.306 | 6.405 |
| −0.564 | −0.316 | 6.405 |
| −0.580 | −0.326 | 6.405 |
| −0.596 | −0.337 | 6.405 |
| −0.599 | −0.339 | 6.405 |
| −0.602 | −0.341 | 6.405 |
| −0.606 | −0.343 | 6.405 |
| −0.609 | −0.346 | 6.405 |
| −0.612 | −0.348 | 6.405 |
| −0.615 | −0.350 | 6.405 |
| −0.618 | −0.352 | 6.405 |
| −0.621 | −0.354 | 6.405 |
| −0.625 | −0.357 | 6.405 |
| −0.628 | −0.359 | 6.405 |
| −0.634 | −0.363 | 6.405 |
| −0.639 | −0.368 | 6.405 |
| −0.645 | −0.373 | 6.405 |
| −0.650 | −0.379 | 6.405 |
| −0.655 | −0.385 | 6.405 |
| −0.659 | −0.391 | 6.405 |
| −0.662 | −0.398 | 6.405 |
| −0.665 | −0.405 | 6.405 |
| −0.667 | −0.412 | 6.405 |
| −0.668 | −0.419 | 6.405 |
| −0.667 | −0.427 | 6.405 |
| −0.663 | −0.434 | 6.405 |
| −0.659 | −0.439 | 6.405 |
| −0.652 | −0.444 | 6.405 |
| −0.645 | −0.447 | 6.405 |
| −0.638 | −0.448 | 6.405 |

TABLE 2-continued

| X | Y | Z |
|---|---|---|
| −0.631 | −0.449 | 6.405 |
| −0.623 | −0.449 | 6.405 |
| | SECTION 9 | |
| −0.694 | −0.494 | 6.605 |
| −0.690 | −0.493 | 6.605 |
| −0.685 | −0.492 | 6.605 |
| −0.681 | −0.492 | 6.605 |
| −0.677 | −0.491 | 6.605 |
| −0.672 | −0.490 | 6.605 |
| −0.668 | −0.489 | 6.605 |
| −0.664 | −0.489 | 6.605 |
| −0.659 | −0.488 | 6.605 |
| −0.655 | −0.487 | 6.605 |
| −0.650 | −0.486 | 6.605 |
| −0.629 | −0.482 | 6.605 |
| −0.607 | −0.477 | 6.605 |
| −0.586 | −0.472 | 6.605 |
| −0.564 | −0.467 | 6.605 |
| −0.543 | −0.461 | 6.605 |
| −0.521 | −0.454 | 6.605 |
| −0.500 | −0.448 | 6.605 |
| −0.479 | −0.441 | 6.605 |
| −0.458 | −0.433 | 6.605 |
| −0.438 | −0.425 | 6.605 |
| −0.417 | −0.417 | 6.605 |
| −0.397 | −0.408 | 6.605 |
| −0.377 | −0.399 | 6.605 |
| −0.357 | −0.390 | 6.605 |
| −0.337 | −0.380 | 6.605 |
| −0.317 | −0.369 | 6.605 |
| −0.298 | −0.356 | 6.605 |
| −0.279 | −0.347 | 6.605 |
| −0.260 | −0.335 | 6.605 |
| −0.241 | −0.323 | 6.605 |
| −0.223 | −0.311 | 6.605 |
| −0.205 | −0.298 | 6.605 |
| −0.187 | −0.285 | 6.605 |
| −0.170 | −0.271 | 6.605 |
| −0.152 | −0.257 | 6.605 |
| −0.136 | −0.243 | 6.605 |
| −0.119 | −0.228 | 6.605 |
| −0.103 | −0.213 | 6.605 |
| −0.087 | −0.198 | 6.605 |
| −0.071 | −0.182 | 6.605 |
| −0.056 | −0.166 | 6.605 |
| −0.040 | −0.150 | 6.605 |
| −0.026 | −0.133 | 6.605 |
| −0.011 | −0.117 | 6.605 |
| 0.003 | −0.100 | 6.605 |
| 0.017 | −0.082 | 6.605 |
| 0.031 | −0.065 | 6.605 |
| 0.045 | −0.048 | 6.605 |
| 0.058 | −0.030 | 6.605 |
| 0.071 | −0.012 | 6.605 |
| 0.084 | 0.006 | 6.605 |
| 0.096 | 0.024 | 6.605 |
| 0.109 | 0.043 | 6.605 |
| 0.121 | 0.061 | 6.605 |
| 0.133 | 0.080 | 6.605 |
| 0.145 | 0.098 | 6.605 |
| 0.157 | 0.117 | 6.605 |
| 0.168 | 0.136 | 6.605 |
| 0.180 | 0.155 | 6.605 |
| 0.191 | 0.174 | 6.605 |
| 0.203 | 0.193 | 6.605 |
| 0.214 | 0.212 | 6.605 |
| 0.225 | 0.231 | 6.605 |
| 0.236 | 0.251 | 6.605 |
| 0.247 | 0.270 | 6.605 |
| 0.258 | 0.289 | 6.605 |
| 0.269 | 0.309 | 6.605 |
| 0.279 | 0.328 | 6.605 |
| 0.290 | 0.348 | 6.605 |
| 0.300 | 0.367 | 6.605 |
| 0.311 | 0.387 | 6.605 |
| 0.321 | 0.406 | 6.605 |

TABLE 2-continued

| X | Y | Z |
|---|---|---|
| 0.331 | 0.426 | 6.605 |
| 0.341 | 0.446 | 6.605 |
| 0.351 | 0.466 | 6.605 |
| 0.361 | 0.485 | 6.605 |
| 0.371 | 0.505 | 6.605 |
| 0.380 | 0.525 | 6.605 |
| 0.390 | 0.545 | 6.605 |
| 0.399 | 0.566 | 6.605 |
| 0.408 | 0.586 | 6.605 |
| 0.417 | 0.606 | 6.605 |
| 0.426 | 0.626 | 6.605 |
| 0.435 | 0.647 | 6.605 |
| 0.444 | 0.667 | 6.605 |
| 0.452 | 0.688 | 6.605 |
| 0.460 | 0.708 | 6.605 |
| 0.468 | 0.729 | 6.605 |
| 0.476 | 0.749 | 6.605 |
| 0.478 | 0.754 | 6.605 |
| 0.479 | 0.758 | 6.605 |
| 0.481 | 0.762 | 6.605 |
| 0.483 | 0.766 | 6.605 |
| 0.484 | 0.770 | 6.605 |
| 0.486 | 0.774 | 6.605 |
| 0.487 | 0.779 | 6.605 |
| 0.489 | 0.783 | 6.605 |
| 0.490 | 0.787 | 6.605 |
| 0.492 | 0.791 | 6.605 |
| 0.492 | 0.793 | 6.605 |
| 0.492 | 0.795 | 6.605 |
| 0.492 | 0.797 | 6.605 |
| 0.492 | 0.799 | 6.605 |
| 0.492 | 0.801 | 6.605 |
| 0.491 | 0.802 | 6.605 |
| 0.490 | 0.804 | 6.605 |
| 0.489 | 0.806 | 6.605 |
| 0.488 | 0.807 | 6.605 |
| 0.486 | 0.808 | 6.605 |
| 0.484 | 0.809 | 6.605 |
| 0.482 | 0.809 | 6.605 |
| 0.480 | 0.809 | 6.605 |
| 0.478 | 0.809 | 6.605 |
| 0.477 | 0.808 | 6.605 |
| 0.475 | 0.807 | 6.605 |
| 0.474 | 0.806 | 6.605 |
| 0.472 | 0.804 | 6.605 |
| 0.472 | 0.803 | 6.605 |
| 0.470 | 0.799 | 6.605 |
| 0.469 | 0.795 | 6.605 |
| 0.467 | 0.791 | 6.605 |
| 0.465 | 0.787 | 6.605 |
| 0.464 | 0.783 | 6.605 |
| 0.462 | 0.780 | 6.605 |
| 0.461 | 0.776 | 6.605 |
| 0.459 | 0.772 | 6.605 |
| 0.457 | 0.768 | 6.605 |
| 0.456 | 0.764 | 6.605 |
| 0.448 | 0.745 | 6.605 |
| 0.439 | 0.726 | 6.605 |
| 0.431 | 0.707 | 6.605 |
| 0.422 | 0.688 | 6.605 |
| 0.413 | 0.670 | 6.605 |
| 0.404 | 0.651 | 6.605 |
| 0.395 | 0.632 | 6.605 |
| 0.386 | 0.614 | 6.605 |
| 0.376 | 0.595 | 6.605 |
| 0.367 | 0.577 | 6.605 |
| 0.357 | 0.559 | 6.605 |
| 0.347 | 0.541 | 6.605 |
| 0.337 | 0.522 | 6.605 |
| 0.326 | 0.504 | 6.605 |
| 0.316 | 0.487 | 6.605 |
| 0.305 | 0.469 | 6.605 |
| 0.294 | 0.451 | 6.605 |
| 0.283 | 0.434 | 6.605 |
| 0.272 | 0.416 | 6.605 |
| 0.261 | 0.399 | 6.605 |
| 0.249 | 0.381 | 6.605 |

TABLE 2-continued

| X | Y | Z |
|---|---|---|
| 0.238 | 0.364 | 6.605 |
| 0.226 | 0.347 | 6.605 |
| 0.214 | 0.330 | 6.605 |
| 0.202 | 0.314 | 6.605 |
| 0.189 | 0.297 | 6.605 |
| 0.177 | 0.280 | 6.605 |
| 0.164 | 0.264 | 6.605 |
| 0.151 | 0.248 | 6.605 |
| 0.138 | 0.232 | 6.605 |
| 0.125 | 0.216 | 6.605 |
| 0.111 | 0.200 | 6.605 |
| 0.098 | 0.184 | 6.605 |
| 0.084 | 0.169 | 6.605 |
| 0.070 | 0.153 | 6.605 |
| 0.056 | 0.138 | 6.605 |
| 0.041 | 0.123 | 6.605 |
| 0.027 | 0.108 | 6.605 |
| 0.012 | 0.094 | 6.605 |
| −0.003 | 0.079 | 6.605 |
| −0.018 | 0.065 | 6.605 |
| −0.033 | 0.051 | 6.605 |
| −0.048 | 0.037 | 6.605 |
| −0.064 | 0.023 | 6.605 |
| −0.079 | 0.010 | 6.605 |
| −0.095 | −0.004 | 6.605 |
| −0.111 | −0.017 | 6.605 |
| −0.128 | −0.030 | 6.605 |
| −0.144 | −0.042 | 6.605 |
| −0.161 | −0.055 | 6.605 |
| −0.177 | −0.067 | 6.605 |
| −0.194 | −0.079 | 6.605 |
| −0.211 | −0.091 | 6.605 |
| −0.228 | −0.103 | 6.605 |
| −0.245 | −0.115 | 6.605 |
| −0.263 | −0.126 | 6.605 |
| −0.280 | −0.138 | 6.605 |
| −0.297 | −0.149 | 6.605 |
| −0.315 | −0.160 | 6.605 |
| −0.333 | −0.171 | 6.605 |
| −0.350 | −0.182 | 6.605 |
| −0.368 | −0.192 | 6.605 |
| −0.386 | −0.203 | 6.605 |
| −0.404 | −0.213 | 6.605 |
| −0.422 | −0.224 | 6.605 |
| −0.440 | −0.234 | 6.605 |
| −0.458 | −0.245 | 6.605 |
| −0.475 | −0.255 | 6.605 |
| −0.493 | −0.266 | 6.605 |
| −0.511 | −0.276 | 6.605 |
| −0.529 | −0.287 | 6.605 |
| −0.547 | −0.297 | 6.605 |
| −0.565 | −0.308 | 6.605 |
| −0.583 | −0.318 | 6.605 |
| −0.600 | −0.329 | 6.605 |
| −0.618 | −0.340 | 6.605 |
| −0.636 | −0.351 | 6.605 |
| −0.653 | −0.363 | 6.605 |
| −0.670 | −0.374 | 6.605 |
| −0.674 | −0.376 | 6.605 |
| −0.677 | −0.379 | 6.605 |
| −0.681 | −0.381 | 6.605 |
| −0.684 | −0.383 | 6.605 |
| −0.687 | −0.386 | 6.605 |
| −0.691 | −0.388 | 6.605 |
| −0.694 | −0.390 | 6.605 |
| −0.698 | −0.393 | 6.605 |
| −0.701 | −0.395 | 6.605 |
| −0.704 | −0.398 | 6.605 |
| −0.711 | −0.402 | 6.605 |
| −0.717 | −0.408 | 6.605 |
| −0.723 | −0.413 | 6.605 |
| −0.729 | −0.419 | 6.605 |
| −0.734 | −0.426 | 6.605 |
| −0.739 | −0.432 | 6.605 |
| −0.743 | −0.439 | 6.605 |
| −0.746 | −0.447 | 6.605 |
| −0.748 | −0.455 | 6.605 |

TABLE 2-continued

| X | Y | Z |
|---|---|---|
| −0.749 | −0.463 | 6.605 |
| −0.749 | −0.471 | 6.605 |
| −0.746 | −0.478 | 6.605 |
| −0.741 | −0.485 | 6.605 |
| −0.734 | −0.490 | 6.605 |
| −0.727 | −0.493 | 6.605 |
| −0.719 | −0.495 | 6.605 |
| −0.710 | −0.495 | 6.605 |
| −0.702 | −0.495 | 6.605 |
| | SECTION 10 | |
| −0.774 | −0.541 | 6.805 |
| −0.769 | −0.540 | 6.805 |
| −0.764 | −0.539 | 6.805 |
| −0.760 | −0.538 | 6.805 |
| −0.755 | −0.537 | 6.805 |
| −0.750 | −0.537 | 6.805 |
| −0.745 | −0.536 | 6.805 |
| −0.741 | −0.535 | 6.805 |
| −0.736 | −0.534 | 6.805 |
| −0.731 | −0.533 | 6.805 |
| −0.727 | −0.532 | 6.805 |
| −0.703 | −0.528 | 6.805 |
| −0.680 | −0.523 | 6.805 |
| −0.656 | −0.518 | 6.805 |
| −0.633 | −0.512 | 6.805 |
| −0.610 | −0.506 | 6.805 |
| −0.587 | −0.500 | 6.805 |
| −0.564 | −0.493 | 6.805 |
| −0.541 | −0.486 | 6.805 |
| −0.518 | −0.478 | 6.805 |
| −0.496 | −0.470 | 6.805 |
| −0.474 | −0.462 | 6.805 |
| −0.451 | −0.453 | 6.805 |
| −0.429 | −0.444 | 6.805 |
| −0.407 | −0.434 | 6.805 |
| −0.385 | −0.424 | 6.805 |
| −0.364 | −0.413 | 6.805 |
| −0.343 | −0.402 | 6.805 |
| −0.322 | −0.391 | 6.805 |
| −0.302 | −0.379 | 6.805 |
| −0.281 | −0.366 | 6.805 |
| −0.261 | −0.354 | 6.805 |
| −0.241 | −0.340 | 6.805 |
| −0.221 | −0.326 | 6.805 |
| −0.202 | −0.312 | 6.805 |
| −0.183 | −0.298 | 6.805 |
| −0.165 | −0.283 | 6.805 |
| −0.146 | −0.267 | 6.805 |
| −0.128 | −0.251 | 6.805 |
| −0.111 | −0.235 | 6.805 |
| −0.094 | −0.219 | 6.805 |
| −0.077 | −0.202 | 6.805 |
| −0.060 | −0.184 | 6.805 |
| −0.044 | −0.167 | 6.805 |
| −0.028 | −0.149 | 6.805 |
| −0.012 | −0.131 | 6.805 |
| 0.003 | −0.112 | 6.805 |
| 0.018 | −0.094 | 6.805 |
| 0.032 | −0.075 | 6.805 |
| 0.047 | −0.056 | 6.805 |
| 0.060 | −0.036 | 6.805 |
| 0.074 | −0.017 | 6.805 |
| 0.088 | 0.003 | 6.805 |
| 0.101 | 0.023 | 6.805 |
| 0.114 | 0.043 | 6.805 |
| 0.126 | 0.064 | 6.805 |
| 0.139 | 0.084 | 6.805 |
| 0.151 | 0.104 | 6.805 |
| 0.163 | 0.125 | 6.805 |
| 0.175 | 0.146 | 6.805 |
| 0.187 | 0.166 | 6.805 |
| 0.199 | 0.187 | 6.805 |
| 0.211 | 0.208 | 6.805 |
| 0.222 | 0.229 | 6.805 |
| 0.234 | 0.250 | 6.805 |
| 0.245 | 0.271 | 6.805 |

TABLE 2-continued

| X | Y | Z |
|---|---|---|
| 0.256 | 0.292 | 6.805 |
| 0.267 | 0.314 | 6.805 |
| 0.278 | 0.335 | 6.805 |
| 0.289 | 0.356 | 6.805 |
| 0.300 | 0.378 | 6.805 |
| 0.310 | 0.399 | 6.805 |
| 0.321 | 0.421 | 6.805 |
| 0.331 | 0.442 | 6.805 |
| 0.341 | 0.464 | 6.805 |
| 0.351 | 0.485 | 6.805 |
| 0.361 | 0.507 | 6.805 |
| 0.371 | 0.529 | 6.805 |
| 0.381 | 0.551 | 6.805 |
| 0.390 | 0.573 | 6.805 |
| 0.400 | 0.595 | 6.805 |
| 0.409 | 0.617 | 6.805 |
| 0.418 | 0.639 | 6.805 |
| 0.427 | 0.661 | 6.805 |
| 0.436 | 0.683 | 6.805 |
| 0.444 | 0.706 | 6.805 |
| 0.453 | 0.728 | 6.805 |
| 0.461 | 0.750 | 6.805 |
| 0.469 | 0.773 | 6.805 |
| 0.477 | 0.796 | 6.805 |
| 0.479 | 0.800 | 6.805 |
| 0.480 | 0.805 | 6.805 |
| 0.482 | 0.809 | 6.805 |
| 0.483 | 0.814 | 6.805 |
| 0.485 | 0.818 | 6.805 |
| 0.486 | 0.823 | 6.805 |
| 0.488 | 0.827 | 6.805 |
| 0.489 | 0.832 | 6.805 |
| 0.491 | 0.836 | 6.805 |
| 0.492 | 0.841 | 6.805 |
| 0.493 | 0.843 | 6.805 |
| 0.493 | 0.845 | 6.805 |
| 0.493 | 0.847 | 6.805 |
| 0.492 | 0.849 | 6.805 |
| 0.492 | 0.850 | 6.805 |
| 0.491 | 0.852 | 6.805 |
| 0.490 | 0.854 | 6.805 |
| 0.489 | 0.855 | 6.805 |
| 0.488 | 0.857 | 6.805 |
| 0.486 | 0.858 | 6.805 |
| 0.484 | 0.859 | 6.805 |
| 0.482 | 0.859 | 6.805 |
| 0.480 | 0.859 | 6.805 |
| 0.479 | 0.859 | 6.805 |
| 0.477 | 0.858 | 6.805 |
| 0.475 | 0.857 | 6.805 |
| 0.474 | 0.855 | 6.805 |
| 0.473 | 0.854 | 6.805 |
| 0.472 | 0.852 | 6.805 |
| 0.471 | 0.848 | 6.805 |
| 0.469 | 0.843 | 6.805 |
| 0.468 | 0.839 | 6.805 |
| 0.466 | 0.835 | 6.805 |
| 0.464 | 0.831 | 6.805 |
| 0.463 | 0.827 | 6.805 |
| 0.461 | 0.823 | 6.805 |
| 0.460 | 0.818 | 6.805 |
| 0.458 | 0.814 | 6.805 |
| 0.457 | 0.810 | 6.805 |
| 0.449 | 0.789 | 6.805 |
| 0.440 | 0.769 | 6.805 |
| 0.432 | 0.748 | 6.805 |
| 0.423 | 0.727 | 6.805 |
| 0.415 | 0.707 | 6.805 |
| 0.405 | 0.687 | 6.805 |
| 0.396 | 0.666 | 6.805 |
| 0.387 | 0.646 | 6.805 |
| 0.377 | 0.626 | 6.805 |
| 0.367 | 0.606 | 6.805 |
| 0.357 | 0.586 | 6.805 |
| 0.347 | 0.567 | 6.805 |
| 0.337 | 0.547 | 6.805 |
| 0.326 | 0.527 | 6.805 |

TABLE 2-continued

| X | Y | Z |
|---|---|---|
| 0.315 | 0.508 | 6.805 |
| 0.304 | 0.489 | 6.805 |
| 0.293 | 0.469 | 6.805 |
| 0.281 | 0.450 | 6.805 |
| 0.270 | 0.431 | 6.805 |
| 0.258 | 0.412 | 6.805 |
| 0.246 | 0.394 | 6.805 |
| 0.233 | 0.375 | 6.805 |
| 0.221 | 0.357 | 6.805 |
| 0.208 | 0.339 | 6.805 |
| 0.195 | 0.320 | 6.805 |
| 0.182 | 0.303 | 6.805 |
| 0.169 | 0.285 | 6.805 |
| 0.155 | 0.267 | 6.805 |
| 0.141 | 0.250 | 6.805 |
| 0.127 | 0.232 | 6.805 |
| 0.113 | 0.215 | 6.805 |
| 0.098 | 0.198 | 6.805 |
| 0.084 | 0.182 | 6.805 |
| 0.069 | 0.165 | 6.805 |
| 0.054 | 0.149 | 6.805 |
| 0.038 | 0.133 | 6.805 |
| 0.023 | 0.117 | 6.805 |
| 0.007 | 0.101 | 6.805 |
| −0.009 | 0.085 | 6.805 |
| −0.025 | 0.070 | 6.805 |
| −0.042 | 0.055 | 6.805 |
| −0.058 | 0.040 | 6.805 |
| −0.075 | 0.026 | 6.805 |
| −0.092 | 0.011 | 6.805 |
| −0.109 | −0.003 | 6.805 |
| −0.127 | −0.017 | 6.805 |
| −0.144 | −0.031 | 6.805 |
| −0.162 | −0.044 | 6.805 |
| −0.180 | −0.058 | 6.805 |
| −0.198 | −0.071 | 6.805 |
| −0.216 | −0.084 | 6.805 |
| −0.234 | −0.096 | 6.805 |
| −0.252 | −0.109 | 6.805 |
| −0.271 | −0.121 | 6.805 |
| −0.289 | −0.134 | 6.805 |
| −0.308 | −0.146 | 6.805 |
| −0.327 | −0.158 | 6.805 |
| −0.346 | −0.169 | 6.805 |
| −0.365 | −0.181 | 6.805 |
| −0.384 | −0.193 | 6.805 |
| −0.403 | −0.204 | 6.805 |
| −0.422 | −0.216 | 6.805 |
| −0.441 | −0.227 | 6.805 |
| −0.460 | −0.238 | 6.805 |
| −0.479 | −0.250 | 6.805 |
| −0.499 | −0.261 | 6.805 |
| −0.518 | −0.272 | 6.805 |
| −0.537 | −0.283 | 6.805 |
| −0.556 | −0.294 | 6.805 |
| −0.576 | −0.306 | 6.805 |
| −0.595 | −0.317 | 6.805 |
| −0.614 | −0.329 | 6.805 |
| −0.633 | −0.340 | 6.805 |
| −0.652 | −0.352 | 6.805 |
| −0.671 | −0.363 | 6.805 |
| −0.690 | −0.375 | 6.805 |
| −0.708 | −0.387 | 6.805 |
| −0.727 | −0.399 | 6.805 |
| −0.746 | −0.412 | 6.805 |
| −0.749 | −0.414 | 6.805 |
| −0.753 | −0.417 | 6.805 |
| −0.757 | −0.419 | 6.805 |
| −0.760 | −0.422 | 6.805 |
| −0.764 | −0.424 | 6.805 |
| −0.768 | −0.427 | 6.805 |
| −0.771 | −0.429 | 6.805 |
| −0.775 | −0.432 | 6.805 |
| −0.779 | −0.434 | 6.805 |
| −0.782 | −0.437 | 6.805 |
| −0.789 | −0.442 | 6.805 |
| −0.796 | −0.448 | 6.805 |

TABLE 2-continued

| X | Y | Z |
|---|---|---|
| −0.802 | −0.454 | 6.805 |
| −0.808 | −0.460 | 6.805 |
| −0.814 | −0.467 | 6.805 |
| −0.819 | −0.474 | 6.805 |
| −0.824 | −0.481 | 6.805 |
| −0.827 | −0.489 | 6.805 |
| −0.830 | −0.497 | 6.805 |
| −0.831 | −0.506 | 6.805 |
| −0.831 | −0.515 | 6.805 |
| −0.828 | −0.523 | 6.805 |
| −0.823 | −0.530 | 6.805 |
| −0.816 | −0.536 | 6.805 |
| −0.808 | −0.539 | 6.805 |
| −0.800 | −0.541 | 6.805 |
| −0.791 | −0.542 | 6.805 |
| −0.782 | −0.542 | 6.805 |
| | SECTION 11 | |
| −0.931 | −0.633 | 7.205 |
| −0.925 | −0.632 | 7.205 |
| −0.920 | −0.631 | 7.205 |
| −0.914 | −0.630 | 7.205 |
| −0.909 | −0.629 | 7.205 |
| −0.903 | −0.628 | 7.205 |
| −0.898 | −0.628 | 7.205 |
| −0.893 | −0.627 | 7.205 |
| −0.887 | −0.626 | 7.205 |
| −0.882 | −0.625 | 7.205 |
| −0.876 | −0.624 | 7.205 |
| −0.849 | −0.619 | 7.205 |
| −0.822 | −0.614 | 7.205 |
| −0.795 | −0.609 | 7.205 |
| −0.769 | −0.603 | 7.205 |
| −0.742 | −0.597 | 7.205 |
| −0.715 | −0.590 | 7.205 |
| −0.689 | −0.583 | 7.205 |
| −0.662 | −0.576 | 7.205 |
| −0.636 | −0.568 | 7.205 |
| −0.610 | −0.560 | 7.205 |
| −0.583 | −0.551 | 7.205 |
| −0.558 | −0.542 | 7.205 |
| −0.532 | −0.533 | 7.205 |
| −0.506 | −0.523 | 7.205 |
| −0.481 | −0.513 | 7.205 |
| −0.456 | −0.502 | 7.205 |
| −0.431 | −0.490 | 7.205 |
| −0.406 | −0.478 | 7.205 |
| −0.381 | −0.466 | 7.205 |
| −0.357 | −0.453 | 7.205 |
| −0.333 | −0.439 | 7.205 |
| −0.310 | −0.425 | 7.205 |
| −0.286 | −0.411 | 7.205 |
| −0.263 | −0.396 | 7.205 |
| −0.241 | −0.380 | 7.205 |
| −0.219 | −0.364 | 7.205 |
| −0.197 | −0.347 | 7.205 |
| −0.175 | −0.330 | 7.205 |
| −0.154 | −0.312 | 7.205 |
| −0.134 | −0.294 | 7.205 |
| −0.114 | −0.276 | 7.205 |
| −0.094 | −0.256 | 7.205 |
| −0.075 | −0.237 | 7.205 |
| −0.056 | −0.217 | 7.205 |
| −0.038 | −0.196 | 7.205 |
| −0.020 | −0.175 | 7.205 |
| −0.003 | −0.154 | 7.205 |
| 0.014 | −0.132 | 7.205 |
| 0.030 | −0.110 | 7.205 |
| 0.046 | −0.088 | 7.205 |
| 0.062 | −0.065 | 7.205 |
| 0.077 | −0.042 | 7.205 |
| 0.092 | −0.019 | 7.205 |
| 0.106 | 0.004 | 7.205 |
| 0.120 | 0.028 | 7.205 |
| 0.134 | 0.052 | 7.205 |
| 0.147 | 0.076 | 7.205 |
| 0.160 | 0.100 | 7.205 |

TABLE 2-continued

| X | Y | Z |
|---|---|---|
| 0.173 | 0.124 | 7.205 |
| 0.185 | 0.149 | 7.205 |
| 0.198 | 0.173 | 7.205 |
| 0.210 | 0.198 | 7.205 |
| 0.222 | 0.222 | 7.205 |
| 0.234 | 0.247 | 7.205 |
| 0.246 | 0.272 | 7.205 |
| 0.258 | 0.297 | 7.205 |
| 0.269 | 0.322 | 7.205 |
| 0.281 | 0.347 | 7.205 |
| 0.292 | 0.372 | 7.205 |
| 0.303 | 0.397 | 7.205 |
| 0.314 | 0.422 | 7.205 |
| 0.324 | 0.447 | 7.205 |
| 0.335 | 0.473 | 7.205 |
| 0.345 | 0.498 | 7.205 |
| 0.356 | 0.524 | 7.205 |
| 0.366 | 0.549 | 7.205 |
| 0.375 | 0.575 | 7.205 |
| 0.385 | 0.600 | 7.205 |
| 0.395 | 0.626 | 7.205 |
| 0.404 | 0.652 | 7.205 |
| 0.413 | 0.678 | 7.205 |
| 0.422 | 0.704 | 7.205 |
| 0.431 | 0.730 | 7.205 |
| 0.439 | 0.756 | 7.205 |
| 0.447 | 0.782 | 7.205 |
| 0.456 | 0.808 | 7.205 |
| 0.463 | 0.835 | 7.205 |
| 0.471 | 0.861 | 7.205 |
| 0.479 | 0.888 | 7.205 |
| 0.480 | 0.893 | 7.205 |
| 0.482 | 0.898 | 7.205 |
| 0.483 | 0.903 | 7.205 |
| 0.484 | 0.909 | 7.205 |
| 0.486 | 0.914 | 7.205 |
| 0.487 | 0.919 | 7.205 |
| 0.489 | 0.925 | 7.205 |
| 0.490 | 0.930 | 7.205 |
| 0.492 | 0.935 | 7.205 |
| 0.493 | 0.941 | 7.205 |
| 0.493 | 0.942 | 7.205 |
| 0.493 | 0.944 | 7.205 |
| 0.493 | 0.946 | 7.205 |
| 0.493 | 0.948 | 7.205 |
| 0.492 | 0.950 | 7.205 |
| 0.491 | 0.952 | 7.205 |
| 0.490 | 0.953 | 7.205 |
| 0.489 | 0.955 | 7.205 |
| 0.488 | 0.956 | 7.205 |
| 0.486 | 0.957 | 7.205 |
| 0.484 | 0.958 | 7.205 |
| 0.482 | 0.958 | 7.205 |
| 0.481 | 0.958 | 7.205 |
| 0.479 | 0.957 | 7.205 |
| 0.477 | 0.956 | 7.205 |
| 0.476 | 0.955 | 7.205 |
| 0.474 | 0.953 | 7.205 |
| 0.474 | 0.952 | 7.205 |
| 0.473 | 0.950 | 7.205 |
| 0.472 | 0.945 | 7.205 |
| 0.470 | 0.940 | 7.205 |
| 0.469 | 0.935 | 7.205 |
| 0.467 | 0.930 | 7.205 |
| 0.466 | 0.926 | 7.205 |
| 0.464 | 0.921 | 7.205 |
| 0.463 | 0.916 | 7.205 |
| 0.462 | 0.911 | 7.205 |
| 0.460 | 0.906 | 7.205 |
| 0.459 | 0.901 | 7.205 |
| 0.451 | 0.877 | 7.205 |
| 0.443 | 0.853 | 7.205 |
| 0.435 | 0.829 | 7.205 |
| 0.427 | 0.805 | 7.205 |
| 0.419 | 0.781 | 7.205 |
| 0.410 | 0.757 | 7.205 |
| 0.401 | 0.734 | 7.205 |

TABLE 2-continued

| X | Y | Z |
|---|---|---|
| 0.392 | 0.710 | 7.205 |
| 0.382 | 0.687 | 7.205 |
| 0.372 | 0.663 | 7.205 |
| 0.362 | 0.640 | 7.205 |
| 0.352 | 0.617 | 7.205 |
| 0.341 | 0.594 | 7.205 |
| 0.330 | 0.572 | 7.205 |
| 0.318 | 0.549 | 7.205 |
| 0.307 | 0.526 | 7.205 |
| 0.295 | 0.504 | 7.205 |
| 0.283 | 0.482 | 7.205 |
| 0.270 | 0.460 | 7.205 |
| 0.257 | 0.438 | 7.205 |
| 0.244 | 0.417 | 7.205 |
| 0.230 | 0.395 | 7.205 |
| 0.216 | 0.374 | 7.205 |
| 0.202 | 0.353 | 7.205 |
| 0.188 | 0.332 | 7.205 |
| 0.173 | 0.312 | 7.205 |
| 0.158 | 0.292 | 7.205 |
| 0.142 | 0.271 | 7.205 |
| 0.126 | 0.252 | 7.205 |
| 0.110 | 0.232 | 7.205 |
| 0.094 | 0.213 | 7.205 |
| 0.077 | 0.194 | 7.205 |
| 0.060 | 0.175 | 7.205 |
| 0.043 | 0.157 | 7.205 |
| 0.025 | 0.139 | 7.205 |
| 0.007 | 0.121 | 7.205 |
| −0.011 | 0.103 | 7.205 |
| −0.029 | 0.086 | 7.205 |
| −0.048 | 0.069 | 7.205 |
| −0.067 | 0.052 | 7.205 |
| −0.086 | 0.036 | 7.205 |
| −0.106 | 0.019 | 7.205 |
| −0.126 | 0.003 | 7.205 |
| −0.146 | −0.012 | 7.205 |
| −0.166 | −0.028 | 7.205 |
| −0.186 | −0.043 | 7.205 |
| −0.206 | −0.058 | 7.205 |
| −0.227 | −0.072 | 7.205 |
| −0.248 | −0.087 | 7.205 |
| −0.269 | −0.101 | 7.205 |
| −0.290 | −0.115 | 7.205 |
| −0.311 | −0.129 | 7.205 |
| −0.332 | −0.143 | 7.205 |
| −0.354 | −0.156 | 7.205 |
| −0.375 | −0.170 | 7.205 |
| −0.397 | −0.183 | 7.205 |
| −0.418 | −0.196 | 7.205 |
| −0.440 | −0.209 | 7.205 |
| −0.462 | −0.222 | 7.205 |
| −0.483 | −0.235 | 7.205 |
| −0.505 | −0.248 | 7.205 |
| −0.527 | −0.261 | 7.205 |
| −0.549 | −0.274 | 7.205 |
| −0.571 | −0.287 | 7.205 |
| −0.593 | −0.299 | 7.205 |
| −0.614 | −0.312 | 7.205 |
| −0.636 | −0.325 | 7.205 |
| −0.658 | −0.338 | 7.205 |
| −0.680 | −0.351 | 7.205 |
| −0.702 | −0.364 | 7.205 |
| −0.723 | −0.377 | 7.205 |
| −0.745 | −0.390 | 7.205 |
| −0.766 | −0.403 | 7.205 |
| −0.788 | −0.417 | 7.205 |
| −0.809 | −0.430 | 7.205 |
| −0.831 | −0.444 | 7.205 |
| −0.852 | −0.458 | 7.205 |
| −0.873 | −0.471 | 7.205 |
| −0.894 | −0.486 | 7.205 |
| −0.898 | −0.488 | 7.205 |
| −0.902 | −0.491 | 7.205 |
| −0.907 | −0.494 | 7.205 |
| −0.911 | −0.497 | 7.205 |
| −0.915 | −0.500 | 7.205 |

TABLE 2-continued

| X | Y | Z |
|---|---|---|
| −0.919 | −0.503 | 7.205 |
| −0.923 | −0.506 | 7.205 |
| −0.927 | −0.508 | 7.205 |
| −0.932 | −0.511 | 7.205 |
| −0.936 | −0.514 | 7.205 |
| −0.944 | −0.520 | 7.205 |
| −0.951 | −0.526 | 7.205 |
| −0.958 | −0.533 | 7.205 |
| −0.965 | −0.540 | 7.205 |
| −0.971 | −0.548 | 7.205 |
| −0.977 | −0.555 | 7.205 |
| −0.982 | −0.564 | 7.205 |
| −0.986 | −0.572 | 7.205 |
| −0.989 | −0.581 | 7.205 |
| −0.991 | −0.591 | 7.205 |
| −0.991 | −0.601 | 7.205 |
| −0.989 | −0.610 | 7.205 |
| −0.984 | −0.618 | 7.205 |
| −0.977 | −0.625 | 7.205 |
| −0.969 | −0.630 | 7.205 |
| −0.960 | −0.632 | 7.205 |
| −0.950 | −0.634 | 7.205 |
| −0.940 | −0.634 | 7.205 |

It should be understood that the finished LPT vane 40*b* does not necessarily include all the sections defined in Table 2. The portion of the airfoil 54 proximal to the platforms 60 and 62 may not be defined by a profile section 66. It should be considered that the vane 40*b* airfoil profile proximal to the platforms 60 and 62 may vary due to several imposed. However the LPT vane 40*b* has an intermediate airfoil portion 64 defined between the inner and outer vane platforms 60 and 62 thereof and which has a profile defined on the basis of at least the intermediate Sections of the various vane profile sections 66 defined in Table 2.

It should be appreciated that the intermediate airfoil portion 64 of the LPT stage vane 40*b* is defined between the inner and outer gaspath walls 28 and 30 which are partially defined by the inner and outer vane platforms 60 and 62. Therefore, the airfoil profile physically appearing on LPT vane 40*b* includes, Sections 3 to 8 of Table 2. Sections 2 and 9 to 11 are partly included within the gaspath. Section 1 is located outside of the boundaries set by the inner and annular outer gaspath walls 28 and 30, but is provided, in part, to fully define the airfoil surface and, in part, to improve curve-fitting of the airfoil at its radially inner distal portion. The skilled reader will appreciate that a suitable fillet radius is to be applied between the platforms 60 and 62 and the airfoil portion of the vane.

The above description is meant to be exemplary only, and one skilled in the art will recognize that changes may be made to the embodiments described without department from the scope of the invention disclosed. For example, the airfoil and/or gaspath definitions of Tables 1 and 2 may be scaled geometrically, while maintaining the same proportional relationship and airfoil shape, for application to gas turbine engine of other sizes. Still other modifications which fall within the scope of the present invention will be apparent to those skilled in the art, in light of a review of this disclosure, and such modifications are intended to fall within the appended claims.

The invention claimed is:

1. A turbine vane for a gas turbine engine comprising an airfoil having an intermediate portion defined by a nominal profile substantially in accordance with Cartesian coordinate values of X, Y, and Z of Sections 3 to 8 set forth in Table 2, wherein the point of origin of the orthogonally related axes X, Y and Z is located at an intersection of a centerline of the gas turbine engine and a stacking line of the turbine vane, the Z values are radial distances measured along the stacking line, the X and Y are coordinate values defining the profile at each distance Z.

2. The turbine vane as defined in claim 1 forming part of a low pressure turbine stage of the gas turbine engine.

3. The turbine vane as defined in claim 2, wherein the vane forms part of a single stage low pressure turbine.

4. The turbine vane as defined in claim 1, wherein the X and Y values are scalable as a function of the same constant or number.

5. The turbine vane as defined in claim 1, wherein the X and Y coordinate values have a manufacturing tolerance of ±0.003.

6. The turbine vane as defined in claim 5, wherein the nominal profile defining the intermediate portion is for an uncoated airfoil.

7. The turbine vane as defined in claim 1, wherein X and Y values define a set of points for each Z value which when connected by smooth continuing arcs define an airfoil profile section, the profile sections at the Z distances being joined smoothly with one another to form an airfoil shape of the intermediate portion.

8. A turbine vane for a gas turbine engine having an intermediate airfoil portion at least partly defined by a nominal profile substantially in accordance with Cartesian coordinate values of X, Y, and Z of Sections 3 to 8 set forth in Table 2, wherein the point of origin of the orthogonally related axes X, Y and Z is located at an intersection of a centerline of the gas turbine engine and a stacking line of the turbine vane, the Z values are radial distances measured along the stacking line, the X and Y are coordinate values defining the profile at each distance Z, and wherein the X and Y values are scalable as a function of the same constant or number.

9. The airfoil as defined in claim 8 forming part of a vane of a low pressure turbine stage of the gas turbine engine.

10. The turbine vane as defined in claim 9, wherein the vane is part of a single stage low pressure turbine.

11. The turbine vane as defined in claim 8, wherein the X and Y coordinate values have a manufacturing tolerance ±0.003 inches.

12. The turbine vane as defined in claim 11, wherein the nominal profile defining the intermediate portion is for an uncoated airfoil.

13. The turbine vane as defined in claim 8, wherein X and Y values define a set of points for each Z value which when connected by smooth continuing arcs define an airfoil profile section, the profile sections at the Z distances being joined smoothly with one another to form an airfoil shape of the intermediate portion.

14. A turbine stator assembly for a gas turbine engine comprising a plurality of vanes, each vanes including an airfoil having an intermediate portion defined by a nominal profile substantially in accordance with Cartesian coordinate values of X, Y, and Z of Sections 3 to 8 set forth in Table 2, wherein the point of origin of the orthogonally related axes X, Y and Z is located at an intersection of a centerline of the gas turbine engine and a stacking line of the turbine vane, the Z values are radial distances measured along the stacking line, the X and Y are coordinate values defining the profile at each distance Z.

15. A low pressure turbine vane comprising at least one airfoil having a surface lying substantially on the points of Table 2, the airfoil extending between platforms defined generally by Table 1, wherein a fillet radius is applied around the airfoil between the airfoil and platforms, and wherein the values of Table 2 are subject to relevant tolerance.

* * * * *